United States Patent
Sadhu

(10) Patent No.: US 11,418,713 B2
(45) Date of Patent: Aug. 16, 2022

(54) INPUT BASED LAUNCH SEQUENCES FOR A CAMERA APPLICATION

(71) Applicant: QUALCOMM Incorporated, San Diego, CA (US)

(72) Inventor: Jagadeeshwar Reddy Sadhu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/838,924

(22) Filed: Apr. 2, 2020

(65) Prior Publication Data
US 2021/0314496 A1 Oct. 7, 2021

(51) Int. Cl.
| H04N 5/232 | (2006.01) |
| G06F 3/04817 | (2022.01) |
| G06F 3/0482 | (2013.01) |
| G06F 3/04883 | (2022.01) |
| H04N 5/235 | (2006.01) |

(52) U.S. Cl.
CPC ..... *H04N 5/232935* (2018.08); *G06F 3/0482* (2013.01); *G06F 3/04817* (2013.01); *G06F 3/04883* (2013.01); *H04N 5/2353* (2013.01)

(58) Field of Classification Search
CPC ............ H04N 5/232935; H04N 5/2353; G06F 3/04817; G06F 3/04883; G06F 3/0482
See application file for complete search history.

(56) References Cited

U.S. PATENT DOCUMENTS

| 8,954,887 B1 | 2/2015 | Tseng et al. |
| 9,019,415 B2 | 4/2015 | Ma et al. |
| 9,244,562 B1 * | 1/2016 | Rosenberg ............. G06F 3/045 |
| 9,521,247 B2 | 12/2016 | Bandyopadhyay et al. |
| 9,584,718 B2 | 2/2017 | Lee et al. |
| 2009/0249206 A1 * | 10/2009 | Stahlberg ............... G11B 27/34 715/716 |

(Continued)

FOREIGN PATENT DOCUMENTS

| CN | 103167179 A | 6/2013 |
| DK | 179754 B1 | 5/2019 |

OTHER PUBLICATIONS

Huawei Ascend G7, "Using Quick Launch to Open the Camera," retrieved from the internet at: <https://videotron.tmtx.ca/en/topic/huawei_ascendg7/using_quick_launch_to_open_the_camera.html#step=2> on Oct. 4, 2019, 1 page.

(Continued)

*Primary Examiner* — Michael Roswell
(74) *Attorney, Agent, or Firm* — Polsinelli LLP

(57) ABSTRACT

Aspects relate to a launch sequence for a camera application. An example method includes obtaining a first user input on a region of a display. The method also includes determining, by a processor, whether the first user input is a first input type or a second input type. The first input type includes the first user input on the region of the display for greater than a threshold amount of time. The second input type includes the first user input on the region of the display for less than the threshold amount of time. The method further includes executing, by the processor, a first launch sequence of a camera application based on the first user input being the first input type. The method may also include executing, by the processor, a second launch sequence of the camera application based on the first user input being the second input type.

112 Claims, 11 Drawing Sheets

(56) References Cited

U.S. PATENT DOCUMENTS

| | | | |
|---|---|---|---|
| 2011/0199470 A1* | 8/2011 | Moller | G06F 1/1694 348/61 |
| 2012/0036556 A1* | 2/2012 | LeBeau | G06F 21/70 726/3 |
| 2012/0054753 A1* | 3/2012 | Nagasaka | G06F 9/445 718/100 |
| 2012/0233571 A1* | 9/2012 | Wever | G06F 3/048 715/835 |
| 2012/0297041 A1* | 11/2012 | Momchilov | H04L 41/0813 709/223 |
| 2013/0326420 A1* | 12/2013 | Liu | G06F 3/0482 715/840 |
| 2013/0329075 A1* | 12/2013 | Liang | H04N 5/2256 348/222.1 |
| 2014/0168130 A1* | 6/2014 | Hirai | G10L 15/00 345/173 |
| 2015/0135108 A1* | 5/2015 | Pope | G06F 3/0484 715/767 |
| 2015/0370617 A1* | 12/2015 | Evans | G06F 9/466 719/318 |
| 2016/0110005 A1* | 4/2016 | Yin | G06F 3/0488 345/173 |
| 2018/0041742 A1* | 2/2018 | Stetson | G06T 11/001 |
| 2019/0250812 A1 | 8/2019 | Davydov et al. | |

OTHER PUBLICATIONS

Huawei, "How to Take Quick Snapshots with Your Huawei Smartphone," published on May 4, 2017, retrieved from the internet at: <https://forum.xda-developers.com/p10/how-to/how-to-quick-snapshots-huawei-smartphone-t3601253> on Oct. 4, 2019, 3 pages.
International Search Report and Written Opinion—PCT/US2021/023763—ISA/EPO—dated Jul. 13, 2021.

* cited by examiner

INPUT BASED LAUNCH SEQUENCES FOR A CAMERA APPLICATION

TECHNICAL FIELD

This disclosure relates generally to image or video capture devices, including performing different launch sequences for a camera application based on an input type on a display of the device.

BACKGROUND

Many devices include or control one or more cameras. For example, a smartphone or tablet includes a display and one or more cameras. The display includes a graphical user interface (GUI) including a camera application icon. For a user to use the device to capture an image or video, the user presses the camera application icon on the display, waits for the camera application to launch (including initializing the one or more cameras, providing a preview to the display, implementing one or more image processing filters, and so on), presses a shutter button of the camera application on the display, waits for the device to capture an image or video, waits for the device to provide a preview of the final processed image or video, and closes the camera application. At this point, the user can continue using the device for other operations.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to a launch sequence for a camera application. An example method includes obtaining a first user input on a region of a display. The method also includes determining, by a processor, whether the first user input is a first input type or a second input type. The first input type includes the first user input on the region of the display for greater than a threshold amount of time. The second input type includes the first user input on the region of the display for less than the threshold amount of time. The method further includes executing, by the processor, a first launch sequence of a camera application based on the first user input being the first input type.

In some implementations, the method includes executing, by the processor, a second launch sequence of the camera application based on and/or in response to the first user input being the second input type. The method may include displaying a camera application graphical user interface on the display in response to executing the second launch sequence and obtaining a user input via the camera application graphical user interface.

Executing the first launch sequence may be in response to a release of the first user input from the region of the display. The method may also include displaying, on the display, a lock screen before obtaining the first user input, wherein the first user input is on the lock screen. In some implementations of the method, obtaining the first user input includes obtaining the first user input on the display when the display is in a low power mode.

The method may also include displaying, on the display, a home screen including one or more icons before obtaining the first user input, wherein the one or more icons includes a camera application icon in the region of the display. In some implementations of the method, executing the first launch sequence causes the device to instruct the display to display a menu. The menu may include two or more selectable entries. Each selectable entry may be associated with one or more of: executing the camera application; capturing an image using default settings for a camera; capturing an image using user custom settings for the camera; capturing a video using default settings for the camera; capturing a video using user custom settings for the camera; performing a burst capture using default settings for the camera; performing a burst capture using user custom settings for the camera; capturing a live image using default settings for the camera; or capturing a live image using user custom settings for the camera. The method may also include obtaining a selection of one of the selectable entries and performing the one or more operations associated with the selection in response to obtaining the selection.

In some implementations of the method, executing the first launch sequence causes the device to instruct a camera controller coupled to the processor to capture an image or video using a camera and prevent the camera controller from performing one or more operations of the camera application. The method may also include capturing, by the camera, the image or video in response to a release of the first user input of the first input type from the region of the display. The method may further include one or more of: initializing the camera using a predetermined focus setting; initializing the camera using a predetermined exposure setting; or configuring an automatic white balance (AWB) filter of an image signal processor using a predetermined AWB setting.

In some implementations, the method includes, based on the first user input of the first input type being on the region of the display for greater than a second threshold amount of time that is greater than the first threshold amount of time, performing one or more of: an autofocus operation to determine a focus setting and initialize the camera using the determined focus setting; an autoexposure operation to determine an exposure setting and initialize the camera using the determined exposure setting; or an AWB operation to determine an AWB setting and configure the AWB filter using the determined AWB setting. The second threshold amount of time may be based on a time to perform one or more of: the autofocus operation; the autoexposure operation; or the AWB operation.

In some implementations, the method includes, based on the first user input of the first input type being on the region of the display for less than the second threshold amount of time, interrupting one or more of the autofocus operation, the autoexposure operation, or the AWB operation and initializing the camera or configuring the AWB filter using a predetermined setting associated with the interrupted operation. The method may also include obtaining a second user input and capturing, by the camera, the image or video in response to obtaining the second user input and based on the first user input being the first input type. The second user input may include one or more of: a bezel squeeze; a movement of a device including the display and the processor; an increased pressure of the first user input on the region of the display; a user press of a physical button; an orientation of the device; or another user input on the display.

The method may include preventing the display from displaying a preview of the image or video to be captured based on executing the first launch sequence. Preventing the display from displaying the preview may include preventing generation of the preview based on executing the first launch sequence. The first launch sequence may exclude one or more operations of a camera application associated with generating the preview. In some implementations, the method includes displaying a windowed preview of the image or video to be captured based on executing the first launch sequence.

In some implementations, the method includes initializing a first image sensor based on executing the first launch sequence and preventing a second image sensor from being initialized based on executing the first launch sequence. The method may also include initializing a third image sensor based on executing the first launch sequence. In some implementations, the first image sensor and the second image sensor are RGB image sensors and the third image sensor is a non-RGB image sensor. The method may include initializing the second image sensor an amount of time after preventing the second image sensor from being initialized based on executing the first launch sequence. Initializing the second image sensor may be based on one or more of: the first user input on the region of the display for greater than the amount of time after preventing the second image sensor from being initialized; the first image sensor not capturing an image or video during the amount of time; or a second user input is not obtained during the amount of time.

In some implementations, the method includes obtaining a second user input on the region of the display. The first user input and the second user input are the first input type. The first user input is on a first subregion of the region of the display. The second user input is on a second subregion of the region of the display. Execution of the first launch sequence based on the first user input causes capturing a first image by a camera. Execution of the first launch sequence based on the second user input causes one of: capturing a second image by the camera using settings different than for capturing the first image by the camera; capturing a video by the camera; or displaying a menu. The camera application may include a video application.

An example apparatus may include a display configured to obtain a first user input on a region of the display. The apparatus also includes a memory and a processor coupled to the memory. The processor is configured to determine whether the first user input is a first input type or a second input type. The first input type includes the first user input on the region of the display for greater than a threshold amount of time, and the second input type includes the first user input on the region of the display for less than the threshold amount of time. The processor is further configured to execute a first launch sequence of the camera application based on the first user input being the first input type.

In some implementations, the processor is further configured to execute a second launch sequence of the camera application based on and/or in response to the first user input being the second input type. The display may be configured to display a camera application graphical user interface on the display in response to executing the second launch sequence.

The processor may be configured to execute the first launch sequence in response to a release of the first user input from the region of the display. The display may be configured to display a lock screen before obtaining the first user input, wherein the first user input is on the lock screen. In some implementations, the display is configured to obtain the first user input when the display is in a low power mode.

The display may also be configured to display a home screen including one or more icons before obtaining the first user input, wherein the one or more icons includes a camera application icon in the region of the display. The display may also be configured to obtain a user input via the camera application graphical user interface. In some implementations, the apparatus further includes a camera, and executing the first launch sequence causes the device to instruct the display to display a menu. The menu may include two or more selectable entries. Each selectable entry may be associated with one or more of: executing the camera application; capturing an image using default settings for a camera; capturing an image using user custom settings for the camera; capturing a video using default settings for the camera; capturing a video using user custom settings for the camera; performing a burst capture using default settings for the camera; performing a burst capture using user custom settings for the camera; capturing a live image using default settings for the camera; or capturing a live image using user custom settings for the camera. In some implementations, the display may be configured to obtain a selection of one of the selectable entries. The apparatus may be configured to perform the one or more operations associated with the selection in response to obtaining the selection.

In some implementations, the apparatus may include a camera controller coupled to the processor. Executing the first launch sequence may cause the camera controller to capture an image or video using a camera and prevent the camera controller from performing one or more operations of the camera application. The apparatus may also include the camera configured to capture the image or video in response to a release of the first user input of the first input type from the region of the display. The apparatus may further include an image signal processor. Execution of the first launch sequence may cause the apparatus to perform one or more of: initializing the camera using a predetermined focus setting; initializing the camera using a predetermined exposure setting; or configuring an automatic white balance (AWB) filter of the image signal processor using a predetermined AWB setting.

In some implementations, execution of the first launch sequence causes the apparatus to, based on the first user input of the first input type being on the region of the display for greater than a second threshold amount of time that is greater than the first threshold amount of time, perform one or more of: an autofocus operation to determine a focus setting and initialize the camera using the determined focus setting; an autoexposure operation to determine an exposure setting and initialize the camera using the determined exposure setting; or an AWB operation to determine an AWB setting and configure the AWB filter using the determined AWB setting. The second threshold amount of time may be based on a time to perform one or more of: the autofocus operation; the autoexposure operation; or the AWB operation.

In some implementations, execution of the first launch sequence may further cause the apparatus to, based on the first user input of the first input type being on the region of the display for less than the second threshold amount of time, interrupt one or more of the autofocus operation, the autoexposure operation, or the AWB operation and initialize the camera or configure the AWB filter using a predetermined setting associated with the interrupted operation. The camera may be configured to capture the image or video in response to obtaining a second user input by the apparatus and based on the first user input being the first input type. The second user input may include one or more of: a bezel squeeze; a movement of the apparatus; an increased pressure of the first user input on the region of the display; a user press of a physical button; an orientation of the apparatus; or another user input on the display.

In some implementations, the display is configured to prevent from displaying a preview of the image or video to be captured based on executing the first launch sequence. The camera controller may be configured to prevent generating the preview based on executing the first launch sequence. The first launch sequence may exclude one or more operations of a camera application associated with generating the preview. In some implementations, the display is configured to display a windowed preview of the image or video to be captured based on executing the first launch sequence.

In some implementations, the apparatus includes a first image sensor and a second image sensor. The first image sensor is configured to be initialized based on executing the first launch sequence, and the second image sensor is configured to be prevented from being initialized based on executing the first launch sequence. The apparatus may also include a third image sensor configured to be initialized based on executing the first launch sequence. In some implementations, the first image sensor and the second image sensor are RGB image sensors and the third image sensor is a non-RGB image sensor. The second image sensor may be configured to be initialized an amount of time after preventing the second image sensor from being initialized based on executing the first launch sequence. In some implementations, the second image sensor is configured to be initialized based on one or more of: the first user input on the region of the display for greater than the amount of time after preventing the second image sensor from being initialized; the first image sensor not capturing an image or video during the amount of time; or the apparatus not obtaining a second user input during the amount of time.

In some implementations, the display is configured to obtain a second user input on the region of the display. The first user input and the second user input are the first input type. The first user input is on a first subregion of the region of the display. The second user input is on a second subregion of the region of the display. Execution of the first launch sequence may cause the apparatus to capture a first image by a camera based on the first user input of the first input type and, based on the second user input of the first input type, perform one of: capturing a second image by the camera using settings different than for capturing the first image by the camera; capturing a video by the camera; or displaying a menu. The camera application may include a video application.

An example non-transitory, computer-readable medium stores instructions that, when executed by a processor of a device, cause the device to obtain a first user input on a region of a display, determine whether the first user input is a first input type or a second input type, and execute a first launch sequence of a camera application based on the first user input being the first input type. The first input type includes the first user input on the region of the display for greater than a threshold amount of time, and the second input type includes the first user input on the region of the display for less than the threshold amount of time.

In some implementations, execution of the instructions causes the device to execute a second launch sequence of the camera application based on and/or in response to the first user input being the second input type. Execution of the instructions may also cause the device to display a camera application graphical user interface on the display in response to executing the second launch sequence and obtain a user input via the camera application graphical user interface.

Executing the first launch sequence may be in response to a release of the first user input of the first input type from the region of the display. Execution of the instructions may also cause the device to display a lock screen before obtaining the first user input, wherein the first user input is on the lock screen. In some implementations, obtaining the first user input includes obtaining the first user input on the display when the display is in a low power mode.

Execution of the instructions may also cause the device to display a home screen including one or more icons before obtaining the first user input, wherein the one or more icons includes a camera application icon in the region of the display. In some implementations, executing the first launch sequence causes the device to instruct the display to display a menu. The menu may include two or more selectable entries. Each selectable entry may be associated with one or more of: executing the camera application; capturing an image using default settings for a camera; capturing an image using user custom settings for the camera; capturing a video using default settings for the camera; capturing a video using user custom settings for the camera; performing a burst capture using default settings for the camera; performing a burst capture using user custom settings for the camera; capturing a live image using default settings for the camera; or capturing a live image using user custom settings for the camera. Execution of the instructions may also cause the device to obtain a selection of one of the selectable entries and perform the one or more operations associated with the selection in response to obtaining the selection.

In some implementations, executing the first launch sequence includes instructing a camera controller coupled to the processor to capture an image or video using a camera and preventing the camera controller from performing one or more operations associated with of the camera application. Execution of the instructions may also cause the device to capture, by the camera, the image or video in response to a release of the first user input of the first input type from the region of the display. Execution of the instructions may further cause the device to perform one or more of: initializing the camera using a predetermined focus setting; initializing the camera using a predetermined exposure setting; or configuring an automatic white balance (AWB) filter of an image signal processor using a predetermined AWB setting.

In some implementations, execution of the instructions further causes the device to, based on the first user input of the first input type on the region of the display for greater than a second threshold amount of time that is greater than the first threshold amount of time, perform one or more of: an autofocus operation to determine a focus setting and initialize the camera using the determined focus setting; an autoexposure operation to determine an exposure setting and initialize the camera using the determined exposure setting; or an AWB operation to determine an AWB setting and configure the AWB filter using the determined AWB setting. The second threshold amount of time may be based on a time to perform one or more of: the autofocus operation; the autoexposure operation; or the AWB operation.

In some implementations, execution of the instructions further causes the device to, based on the first user input of the first input type being on the region of the display for less than the second threshold amount of time, interrupt one or more of the autofocus operation, the autoexposure operation, or the AWB operation and initialize the camera or configure the AWB filter using a predetermined setting associated with the interrupted operation. Execution of the instructions may also cause the device to obtain a second user input and capture the image or video in response to obtaining the second user input and based on the first user input being the first input type. The second user input may include one or more of: a bezel squeeze; a movement of the device; an increased pressure of the first user input on the region of the display; a user press of a physical button; an orientation of the device; or another user input on the display.

Execution of the instructions may further cause the device to prevent the display from displaying a preview of the image or video to be captured based on executing the first launch sequence. Preventing the display from displaying the preview may include preventing generation of the preview based on executing the first launch sequence. The first launch sequence may exclude one or more operations of a second launch sequence associated with generating the preview. In some implementations, execution of the instructions may cause the device to display a windowed preview of the image or video to be captured based on executing the first launch sequence.

In some implementations, execution of the instructions further causes the device to initialize a first image sensor based on executing the first launch sequence and prevent a second image sensor from being initialized based on executing the first launch sequence. Execution of the instructions may also cause the device to initialize a third image sensor based on executing the first launch sequence. In some implementations, the first image sensor and the second image sensor are RGB image sensors and the third image sensor is a non-RGB image sensor. Execution of the instructions may cause the device to initialize the second image sensor an amount of time after preventing the second image sensor from being initialized based on executing the first launch sequence. Initializing the second image sensor may be based on one or more of: the first user input being on the region of the display for greater than the amount of time after preventing the second image sensor from being initialized; the first image sensor not capturing an image or video during the amount of time; or the device not obtaining a second user input during the amount of time.

In some implementations, execution of the instructions causes the device to obtain a second user input on the region of the display. The first user input and the second user input are the first input type. The first user input is on a first subregion of the region of the display. The second user input is on a second subregion of the region of the display. Execution of the first launch sequence for the first user input causes capturing a first image by a camera. Execution of the first launch sequence for the second user input causes one of: capturing a second image by the camera using settings different than for capturing the first image by the camera; capturing a video by the camera; or displaying a menu. The camera application may include a video application.

Another example apparatus includes means for obtaining a first user input on a region of a display. The apparatus also includes means for determining whether the first user input is a first input type or a second input type. The first input type includes the first user input on the region of the display for greater than a threshold amount of time. The second input type includes the first user input on the region of the display for less than the threshold amount of time. The apparatus also includes means for executing a first launch sequence of a camera application based on the first user input being the first input type.

In some implementations, the apparatus further includes means for executing a second launch sequence of the camera application based on and/or in response to the first user input being the second input type. The apparatus may also include means for displaying a camera application graphical user interface on the display in response to executing the second launch sequence and means for obtaining a user input via the camera application graphical user interface.

Executing the first launch sequence may be in response to a release of the first user input from the region of the display. The apparatus may also include means for displaying a lock screen before obtaining the first user input, wherein the first user input is on the lock screen. In some implementations, obtaining the first user input includes obtaining the first user input on the display when the display is in a low power mode.

The apparatus may also include means for displaying a home screen including one or more icons before obtaining the first user input, wherein the one or more icons includes a camera application icon in the region of the display. In some implementations, executing the first launch sequence includes instructing the display to display a menu. The menu may include two or more selectable entries. Each selectable entry may be associated with one or more of: executing the camera application; capturing an image using default settings for a camera; capturing an image using user custom settings for the camera; capturing a video using default settings for the camera; capturing a video using user custom settings for the camera; performing a burst capture using default settings for the camera; performing a burst capture using user custom settings for the camera; capturing a live image using default settings for the camera; or capturing a live image using user custom settings for the camera. The apparatus may also include means for obtaining a selection of one of the selectable entries and means for performing the one or more operations associated with the selection in response to obtaining the selection.

In some implementations, executing the first launch sequence causes the apparatus to capture an image or video using a camera and prevent one or more operations of the camera application from being performed. The apparatus may also include means for capturing the image or video based on executing the first launch sequence in response to a release of the first user input from the region of the display. The apparatus may further include one or more of: means for initializing the camera using a predetermined focus setting; means for initializing the camera using a predetermined exposure setting; or means for configuring an automatic white balance (AWB) filter of an image signal processor using a predetermined AWB setting.

In some implementations, the apparatus includes, based on the first user input of the first input type being on the region of the display for greater than a second threshold amount of time that is greater than the first threshold amount of time, one or more of: means for performing an autofocus operation to determine a focus setting and initialize the camera using the determined focus setting; means for performing an autoexposure operation to determine an exposure setting and initialize the camera using the determined exposure setting; or means for performing an AWB operation to determine an AWB setting and configure the AWB filter using the determined AWB setting. The second threshold amount of time may be based on a time to perform one or more of: the autofocus operation; the autoexposure operation; or the AWB operation.

In some implementations, the apparatus includes, based on the first user input of the first input type being on the region of the display for less than the second threshold amount of time, means for interrupting one or more of the autofocus operation, the autoexposure operation, or the AWB operation and means for initializing the camera or configuring the AWB filter using a predetermined setting associated with the interrupted operation. The apparatus may also include means for obtaining a second user input and means for capturing the image or video in response to obtaining the second user input and based on the first user input being the first input type. The second user input may include one or more of: a bezel squeeze; a movement of the apparatus; an increased pressure of the first user input on the region of the display; a user press of a physical button; an orientation of the apparatus; or another user input on the display.

The apparatus may include means for preventing the display from displaying a preview of the image or video to be captured based on executing the first launch sequence. Preventing the display from displaying the preview may include preventing generation of the preview based on executing the first launch sequence. The first launch sequence may exclude one or more operations of a second launch sequence associated with generating the preview. In some implementations, the apparatus includes means for displaying a windowed preview of the image or video to be captured based on executing the first launch sequence In some implementations, the apparatus includes means for initializing a first image sensor based on executing the first launch sequence and means for preventing a second image sensor from being initialized based on executing the first launch sequence. The apparatus may also include means for initializing a third image sensor based on executing the first launch sequence. In some implementations, the first image sensor and the second image sensor are RGB image sensors and the third image sensor is a non-RGB image sensor. The apparatus may include initializing the second image sensor an amount of time after preventing the second image sensor from being initialized based on executing the first launch sequence. Initializing the second image sensor may be based on one or more of: the first user input on the region of the display for greater than the amount of time after preventing the second image sensor from being initialized; the first image sensor not capturing an image or video during the amount of time; or the apparatus not obtaining a second user input during the amount of time.

In some implementations, the apparatus includes means for obtaining a second user input on the region of the display. The first user input and the second user input are the first input type. The first user input is on a first subregion of the region of the display. The second user input is on a second subregion of the region of the display. Execution of the first launch sequence based on the first user input causes capturing a first image by a camera. Execution of the first launch sequence based on the second user input causes one of: capturing a second image by the camera using settings different than for capturing the first image by the camera; capturing a video by the camera; or displaying a menu. The camera application may include a video application.

Another example method includes obtaining a first user input on a region of a display, and determining, by a processor, whether the first user input is a first input type or a second input type. The first user input is the first input type when on the region of the display for greater than a threshold. The first user input is the second input type when on the region of the display for less than the threshold. The method also includes executing, by the processor, a first launch sequence of a camera application based on the first user input being the first input type. In some implementations of the method, the threshold may include a threshold amount of time, a threshold amount of pressure or a threshold number of taps.

Another example method includes obtaining a first user input on a region of a display, and determining, by a processor, whether the first user input is a first input type or a second input type. The first user input is the first input type when on the region of the display for greater than a threshold. The first user input is the second input type when on the region of the display for less than the threshold. The method also includes executing, by the processor, a first launch sequence of a camera application based on the first user input being the first input type. In some implementations, the threshold may include a threshold amount of time, a threshold amount of pressure or a threshold number of taps.

Another apparatus includes a display configured to obtain a first user input on a region of the display, a memory, and a processor coupled to the memory. The processor is configured to determine whether the first user input is a first input type or a second input type. The first user input is the first input type when on the region of the display for greater than a threshold amount of time. The first user input is the second input type when on the region of the display for less than the threshold. The processor is also configured to execute a first launch sequence of a camera application based on the first user input being the first input type. In some implementations, the threshold may include a threshold amount of time, a threshold amount of pressure or a threshold number of taps.

Another non-transitory, computer-readable medium stores instructions that, when executed by a processor of a device, cause the device to obtain a first user input on a region of a display and determine whether the first user input is a first input type or a second input type. The first user input is a first input type when on the region of the display for greater than a threshold. The first user input is a second input type when on the region of the display for less than the threshold. Execution of the instructions also causes the device to execute a first launch sequence of a camera application based on the first user input being the first input type. In some implementations, the threshold may include a threshold amount of time, a threshold amount of pressure or a threshold number of taps.

Another apparatus includes means for obtaining a first user input on a region of a display and means for determining whether the first user input is a first input type or a second input type. The first user input is the first input type when on the region of the display for greater than a threshold. The first user input is the second input type when on the region of the display for less than the threshold amount of time. The apparatus also includes means for executing a first launch sequence of a camera application based on the first user input being the first input type. In some implementations, the threshold may include a threshold amount of time, a threshold amount of pressure or a threshold number of taps.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Aspects of the present disclosure may be used for image or video capture devices. Some aspects include performing launch sequences of a camera application based on a user input.

When a user wishes to capture an image or video using a smartphone or other capture device, the user must turn on the display (if in a low power mode), unlock the smartphone (if locked), wait for a home screen to be displayed, and press a camera application icon on the home screen. The device then executes a launch sequence of a camera application, and the display displays a graphic user interface (GUI) for the user to interact with to capture an image or video. The user must wait for the launch sequence to be executed, including the GUI to be displayed before proceeding with capturing an image or video. The user may then need to set one or more settings (such as a focus setting), or the user may be required to wait for the device to complete automatic adjustments of one or more settings (such as an auto-focus operation, an automatic white balance operation, or an auto-exposure operation) before the device may capture an image. The user then presses a shutter button on the GUI, waits for the device to capture an image or video, and closes the camera application (such as by exiting the application). The number and sequence of operations may be cumbersome for the user.

Additionally, waiting for the launch sequence of the camera application (including all of its operations, such as displaying the GUI, initializing cameras, and so on) to execute in order to capture an image or video can take a significant amount of time. For example, initializing all of the cameras and generating a preview within a GUI for the camera application after initializing the cameras may take seconds. As a result, if a user wishes to capture an image or video of a moment where time is of the essence, the user may miss capturing the moment. A camera application may be used for generating one or more still images and/or one or more videos. For example, a camera application may include a still image application and/or a video application. As used herein, a video application may refer to an application executed by a device to generate a sequence of images (such as by capturing and processing a sequence of image frames) for a video. As used herein, a still image application may refer to an application executed by a device to generate a still image (such as by capturing and processing an image frame). A camera application may include capabilities of a still image application and a video application.

Figure 1:
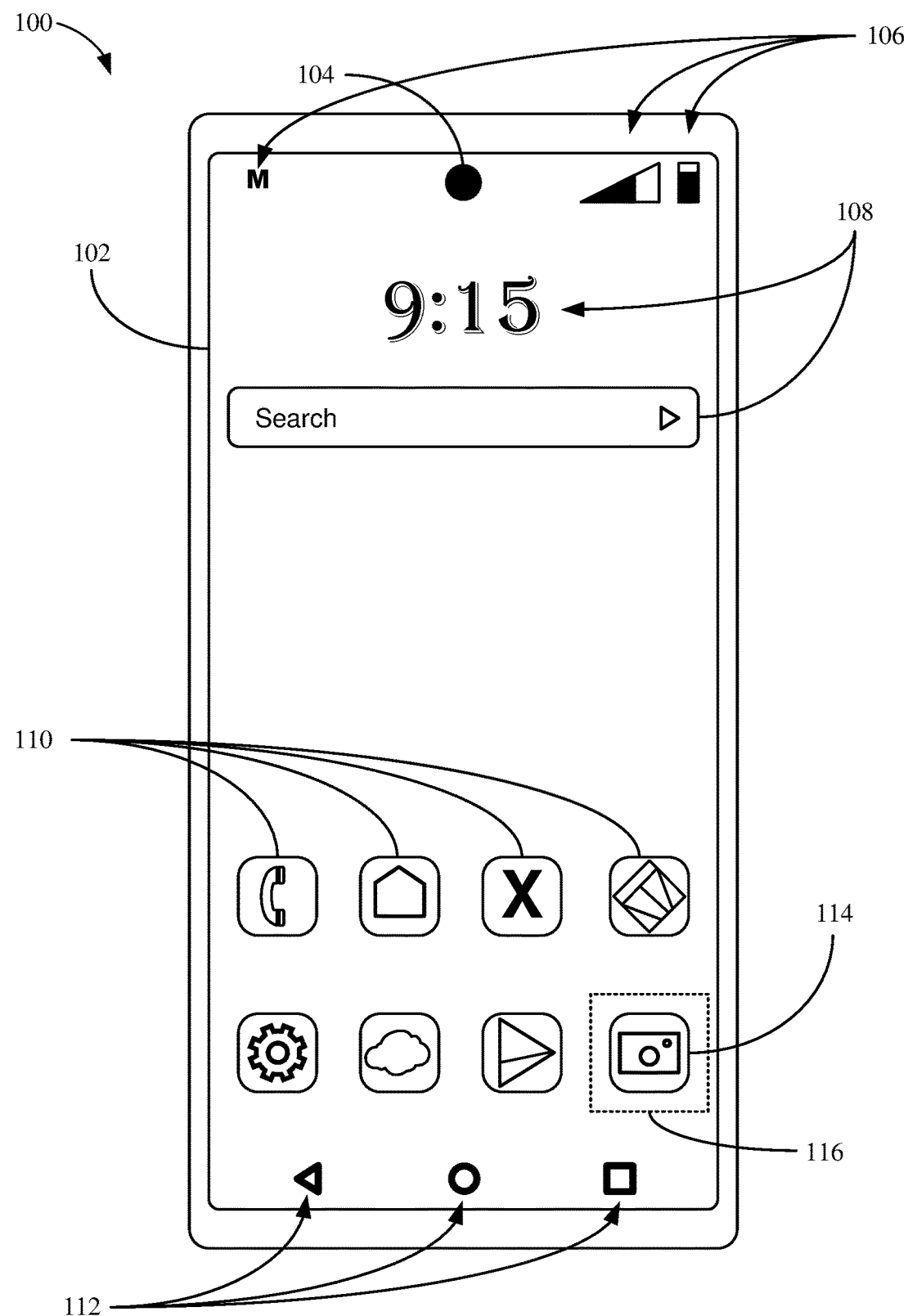
FIG. 1 is a depiction of a device displaying a camera application icon.

FIG. 1 is a depiction of a device 100 displaying (on a display 102) a camera application icon 114. In some implementations, the device 100 is a smartphone. The device 100 includes a front facing camera 104 (which may be positioned in a hole punch of the display 102, in a notch of the display 102, or on a border (such as a bezel) of the device 100 outside the display 102). The display 102 displays a home screen for an operating system. In displaying the home screen, the display 102 displays device indicators 106 (such as battery power remaining, mobile signal strength, one or more notifications, and so on). The device 100 may execute one or more widgets 108, which are displayed by the display 102. As used herein, a widget is an application executed by the device 100 in the background so that the functions of the application are always available. For example, an example widget may indicate the time and be associated with a time application executed by a processor. If a user presses on the displayed time, a GUI associated with the time application (which is running in the background) may be displayed. Another example widget may indicate the weather and be associated with a weather application. A further example widget may include a search bar associated with an application for performing an internet search (such as a web browser application). While widgets may quicken launching of a GUI or performing other tasks (such as an internet search), the widget requires that the associated application be running (which requires computing resources and consumes power).

The display 102, in displaying a home screen, also displays icons 110 associated with applications that can be executed by the device 100. For example, the icons may be associated with a phone application, a messaging application, a device settings application, an internet browser application, a media store application, a document reader application, an electronic mail (e-mail) application, and so on. The display may also display functional buttons 112 (which may include a home button, a back button, and a list button). In response to a user pressing one of the icons 110, the device 100 begins executing operations of ("launches") an application associated with the icon 110. For example, if the user presses a phone icon, the device 100 launches a phone application, which includes executing operations for displaying a phone GUI to enable a user to make a phone call using the device 100.

The icons 110 include a camera application icon 114 (displayed in a region 116 of the display 102) associated with a camera application that can be launched by the device 100 to capture images or video. When a user wants to capture an image or video using the device 100, the user touches the camera application icon 114, and the device 100 executes a launch sequence of the camera application.

Each application launch sequence includes a plurality of operations. For example, a phone application launch sequence may include operations for reading a subscriber identity module (SIM) card and enabling cellular components of the device 100 to make a phone call. The operations may also include displaying a GUI to interface with the user.

Execution of a camera application launch sequence includes a plurality of operations that are executed when launching the camera application. In some implementations, execution of the launch sequence includes initializing one or more cameras (which may include auto-focus operations, auto-exposure operations, and so on), initializing one or more flashes, initializing filters of an image signal processor (such as for AWB operations, denoising, and so on), generating and displaying a GUI, generating a preview for image or video capture, and displaying the preview.

Figure 2A:
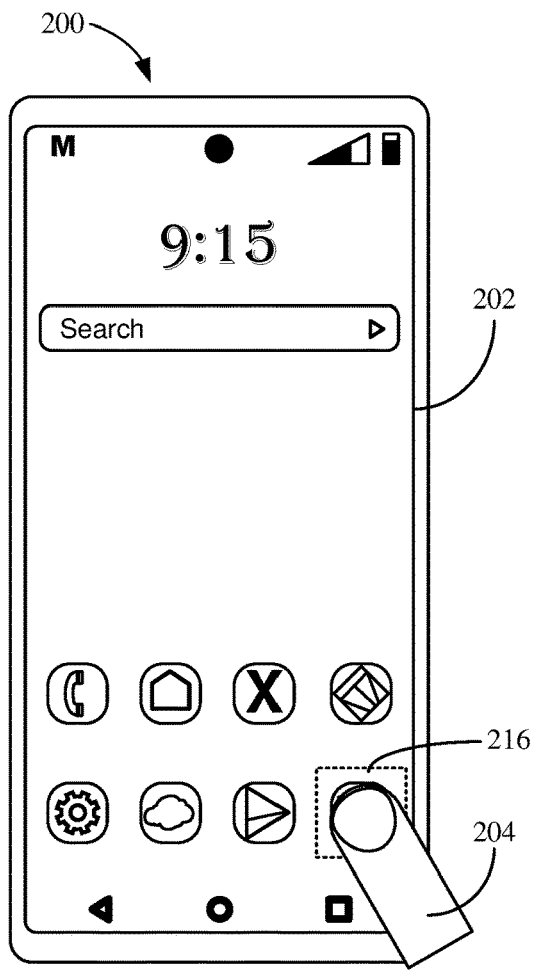
FIG. 2A is a depiction of a device having a user touch a camera application icon to execute a launch sequence of a camera application.
Figure 2B:
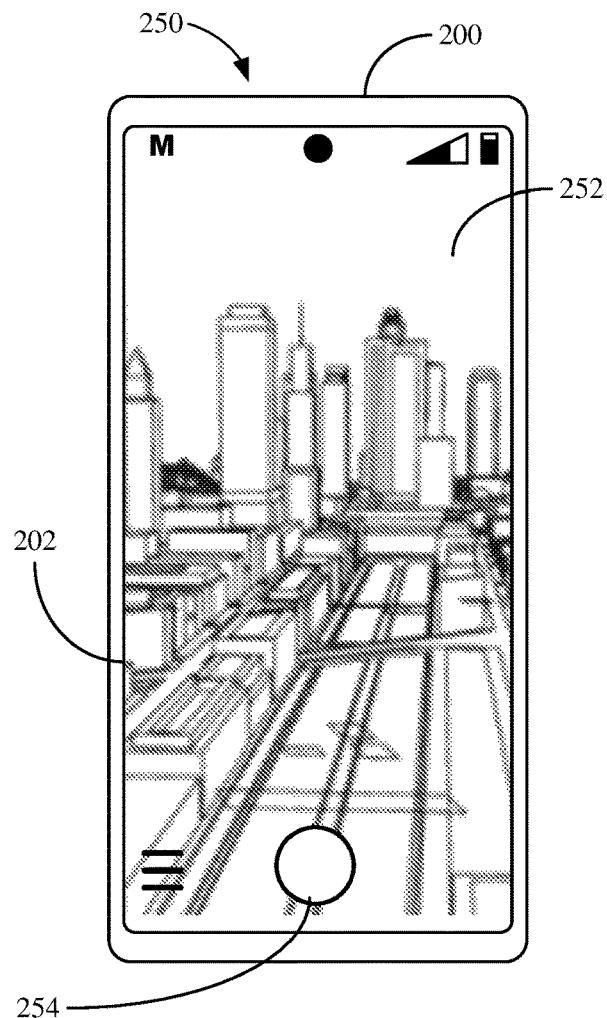
FIG. 2B is a depiction of the device in FIG. 2A executing the camera application based on the launch sequence in response to obtaining the user touch.

FIG. 2A is a depiction of a device 200 having a user touch 204 on a region 216 of the display 202 including a camera application icon to execute a camera application launch sequence. After the user touches the region 216, the user waits for the device 200 to execute the camera application's launch sequence (including its associated operations), as illustrated in FIG. 2B. FIG. 2B is a depiction 250 of the device 200 executing the launch sequence in response to obtaining the user touch. In executing the launch sequence, the device 200 controls the display 202 to display the camera application GUI 252, which includes a shutter button 254.

For the device to capture an image or video after the user presses the region of the display including the camera application button, the user waits for the launch sequence to be executed (including the GUI 252 to be displayed and any other needed camera operations to be performed, such as an auto-focus operation, auto-exposure operation, AWB operation, and so on in launching the camera application). Executing the launch sequence may include operations to initialize all of the cameras and filters in the imaging processing pipeline of the device 200, which may include performing an auto-focus (AF) operation, performing an automatic white balance (AWB), performing an autoexposure operation and other operations for each camera before the camera is able to capture an image or video. The user then presses the shutter button 254 to capture the image or video, waits for the capture, closes the camera application, and continues using the device 200.

Waiting for the launch sequence to execute and the device 200 to capture the image can take a significant amount of time. For example, initializing all of the cameras and generating a preview after initializing the cameras may take seconds. In addition, if the display 202 is in a low power mode (such as not actively displaying), the user may need to wake the display 202 (such as by pressing a power button or the display 202). The device 200 may then be locked and displaying a locked screen, and the user may need to unlock the device 200 (such as via biometric data, a personal identification number (PIN), a password, and so on) before the device 200 displays the home screen. Waking the display 202 and unlocking the device 200 further delays capturing an image or a video. As a result, if a user wishes to capture an image or video of a moment where time is of the essence, the user may miss capturing the moment.

As noted above, widgets may be displayed for applications executed in the background of a device to decrease the amount of time needed to perform one or more operations. To reduce the amount of time needed to capture an image, the device may include a widget (similar to a widget 108 displayed on the display 102 in FIG. 1) associated with the camera application. The device 100 may capture an image in response to the user pressing such widget. In this manner, the camera application is always executed by the device to reduce the amount of time to capture the image (such as by having the cameras and imaging pipeline already initialized before the user presses the widget). However, always executing the camera application consumes processing resources (such as memory and processor cycles) and consumes power (which may drain battery resources), as the cameras must remain initialized and processor cycles must be dedicated to the camera application executed in the background.

In some implementations, the device may be configured to perform different launch sequences of a camera application based on a user input. For example, a user input may indicate a first launch sequence is to be executed to capture an image or video, and the first launch sequence of the camera application may include a reduced set of operations than a second launch sequence in order to be quicker in capturing an image or video. For example, a second launch sequence may be the conventional launch sequence or include all of the operations in typically launching the camera application, and a first launch sequence may be a launch sequence to include different operations or a reduced set of operations in launching the camera application. In some aspects, the different launch sequences may allow for reduced time in capturing images or video when time is of the essence while still allowing for typical operation of the camera application. In some other aspects, the different launch sequences may allow for more or advanced operations to be performed with reference to the camera application based on the input type.

As noted above, a launch sequence of a camera application includes a plurality of operations. As used herein, a first launch sequence may include a subset of the operations of a second launch sequence. In this manner, when the first launch sequence is executed, only a portion of the operations that are typically performed for the second launch sequence of the camera application are performed. For example, executing the first launch sequence may exclude operations for displaying a preview, performing autofocus (AF), AWB, auto-exposure operations, initializing each and every camera, initializing each and every image sensor, and so on. Therefore, the amount of time required to capture an image or video is reduced compared to launching the camera application by executing the second launch sequence.

In some implementations to indicate the device is to execute the first launch sequence, the user presses and holds a region of the display (such as the region of a home screen including the camera application icon) for a threshold amount of time. If the user holds for less than the threshold amount of time, the device may execute the second launch sequence. If the user holds for more than the threshold amount of time, the device may execute the first launch sequence. The device may execute the first launch sequence in response to releasing the press on the display. In some other aspects, the device (executing the first launch sequence) may capture an image or video on the release of the user's press on the display. In this manner, the user operations for capturing an image or video can be simplified. In executing the first launch sequence, the device may forego some operations of the camera application, such as providing a preview, initializing all cameras, performing one or more of AF, auto-exposure, or AWB operations (3A operations), executing the full camera application script, and so on to reduce the amount of time to capture the image or video. Furthermore, since the camera application is not required to be always executed by the device (such as for a widget), the device conserves power and processing resources. Various implementations of performing a launch sequence of a camera application based on a user input are presented herein.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device including or coupled to one or more cameras capable of capturing images or video (such as security systems, smartphones, tablets, laptop computers, digital video and/or still cameras, and so on). Further, aspects of the present disclosure are applicable for capturing still images as well as for capturing video, and may be implemented in devices having or coupled to cameras of the same or different capabilities (such as a video camera or a still image camera) and characteristics (such as resolution, shutter speed, camera sensor type, and so on).

The terms "device" and "apparatus" are not limited to one or a specific number of physical objects (such as one smartphone, one camera controller, one processing system and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

Figure 3:
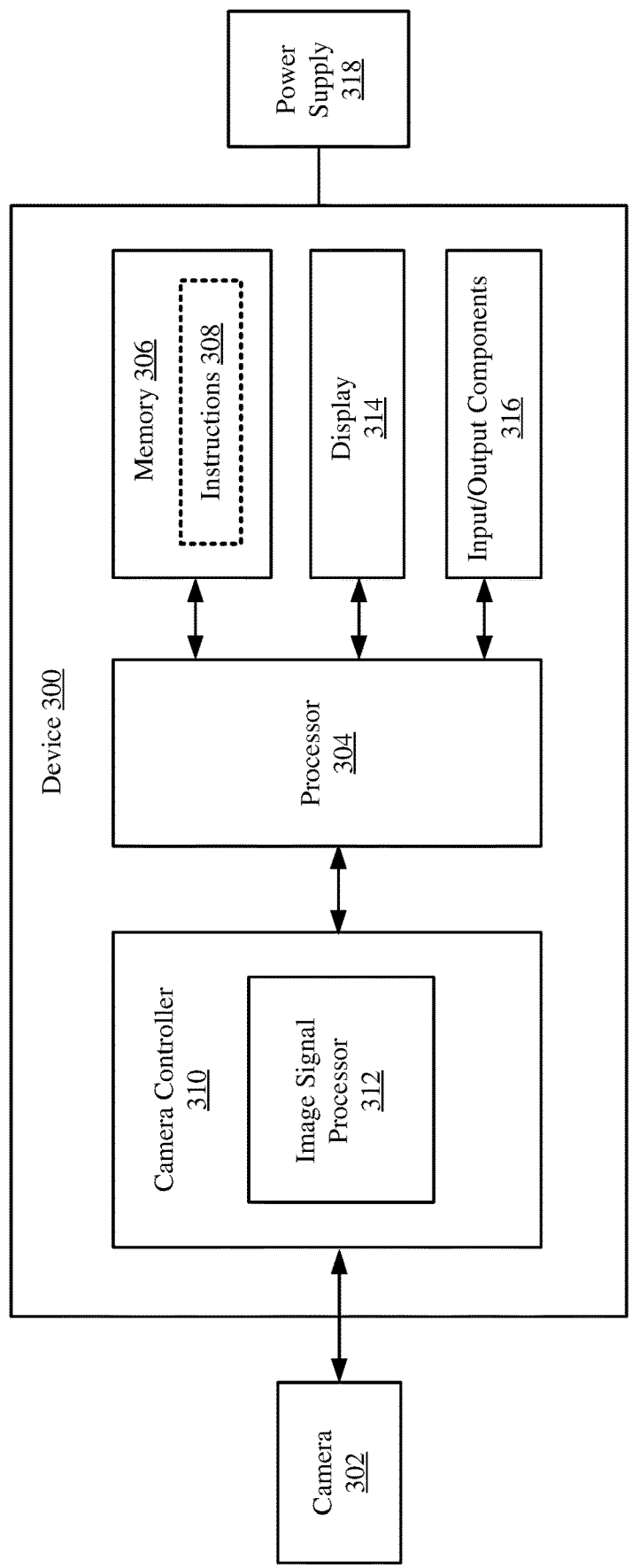
FIG. 3 is a block diagram of an example device for performing launch sequences of a camera application based on a user input.

FIG. 3 is a block diagram of an example device 300 configured to perform launch sequences of a camera application based on a user input. The example device 300 includes or is coupled to a camera 302. The camera 302 may be one or more cameras (such as for one or more single or multiple camera modules). In the example of a smartphone or tablet, the device 300 may include one or more rear facing cameras (on a side of the device opposite of a display) and one or more front facing cameras (on a side of the device including the display). The example device 300 also includes a processor 304, a memory 306 storing instructions 308, a camera controller 310, a display 314, and a number of input/output (I/O) components 316. The device 300 may also include or be coupled to a power supply 318. The device 300 may include additional features or components not shown. In one example, a wireless interface, which may include a number of transceivers and a baseband processor, may be included for a wireless communication device. In another example, one or more motion sensors (such as a gyroscope) may be included in a device.

The camera 302 includes one or more cameras capable of capturing individual image frames (such as still images) and/or capturing video (such as a succession of captured image frames). The camera 302 includes one or more camera sensors (not illustrated). The camera 302 may also include one or more focus lenses, one or more apertures, one or more shutters, or other suitable components for imaging. A camera sensor may be any suitable sensor, such as for capturing color image information (such as including a color filter array), black and white image information (such as not including a color filter array), infrared information, and so on. The device 300 may also include a flash, a depth sensor, or other suitable components for imaging.

The memory 306 may be a non-transient or non-transitory computer readable medium storing computer-executable instructions 308 to perform all or a portion of one or more operations described in this disclosure. In some implementations, the instructions 308 include the operating system executed by the device 300, the camera application to be executed by the device 300, and one or more launch sequences to be executed by the device 300 in launching the camera application. The instructions 308 may also include other applications or programs executed by the device 300. Execution of the operating system (such as by the processor 304) causes the device 300 to execute a first launch sequence or a second launch sequence of a camera application in response to a user pressing a camera application icon (such as the camera application icon 114 in FIG. 1). In some implementations, the operating system is configured such that execution of a specific launch sequence is based on certain user inputs on the display 314. For example, the operating may include instructions that cause the device 300 to determine whether a user input on the display 314 is an input type associated with the first launch sequence or an input type associated with the second launch sequence of the camera application. The camera application includes a plurality of operations performed by the device 300 when the second launch sequence is executed. The first launch sequence may include only a subset of the operations. In this manner, all of the instructions of second launch sequence may not be executed when executing the first launch sequence.

The processor 304 may be one or more suitable processors capable of executing scripts or instructions of one or more software programs (such as instructions 308) stored within the memory 306. For example, the processor 304 may be an applications processor and execute the camera application (including launch sequences based on a user input obtained by the display 314 to launch the camera application). In some implementations, the processor 304 is one or more application processors configured to instruct the camera controller 310 to perform one or more operations with reference to the camera 302. In some aspects, the processor 304 may be one or more general purpose processors that execute instructions 308 to cause the device 300 to perform any number of functions or operations. In additional or alternative aspects, the processor 304 may include integrated circuits or other hardware to perform functions or operations without the use of software.

While shown to be coupled to each other via the processor 304 in the example of FIG. 3, the processor 304, the memory 306, the camera controller 310, the display 314, and the I/O components 316 may be coupled to one another in various arrangements. For example, the processor 304, the memory 306, the camera controller 310, the display 314, and/or the I/O components 316 may be coupled to each other via one or more local buses (not shown for simplicity).

The display 314 may be any suitable display or screen allowing for user interaction and/or to present items (such as captured images, video, or preview images from the camera 302) for viewing by a user. In some aspects, the display 314 is a touch-sensitive display. The I/O components 316 may be or include any suitable mechanism, interface, or device to receive input (such as commands) from the user and to provide output to the user. For example, the I/O components 316 may include (but are not limited to) a graphical user interface, keyboard, mouse, microphone and speakers, a squeezable bezel, one or more buttons (such as a power button), a slider or switch, a gyroscope, magnetometer, or other means to determine a movement or orientation of the device 300, and so on.

The camera controller 310 may include an image signal processor 312, which may be one or more image signal processors to process captured image frames or video provided by the camera 302. In some example implementations, the camera controller 310 (such as the image signal processor 312) also may control operation of the camera 302. For example, the camera controller 310 (such as the image signal processor 312) may receive instructions from the processor 304 to initialize the camera 302, and the camera controller 310 controls initialization of the camera 302 (such as performing one or more of the 3A operations). In some other implementations, the camera controller 310 may be included in the processor 304, and the image signal processor 312 may be separate from the processor 304. In this manner, the processor 304 may control operation of the camera 302, and the image signal processor 304 may be configured to process images or video (such as a sequence of images) captured by the camera 302. In some further implementations, the processor 304 and the image signal processor 312 may be embodied on a single system on chip (SoC).

In some aspects, the image signal processor 312 may execute instructions from a memory (such as instructions 308 from the memory 306, instructions stored in a separate memory coupled to the image signal processor 312, or instructions provided by the processor 304). In addition or alternative to the image signal processor 312 including one or more general purpose processors configured to execute software, the image signal processor 312 may include specific hardware to perform one or more operations described in the present disclosure. The image signal processor 312 alternatively or additionally may include a combination of specific hardware and the ability to execute software instructions. While the following examples for performing a launch sequence of a camera application are described with reference to the example device 300 in FIG. 3, any suitable device, apparatus, or configuration of components including or coupled to a camera may be used.

Figure 4A:
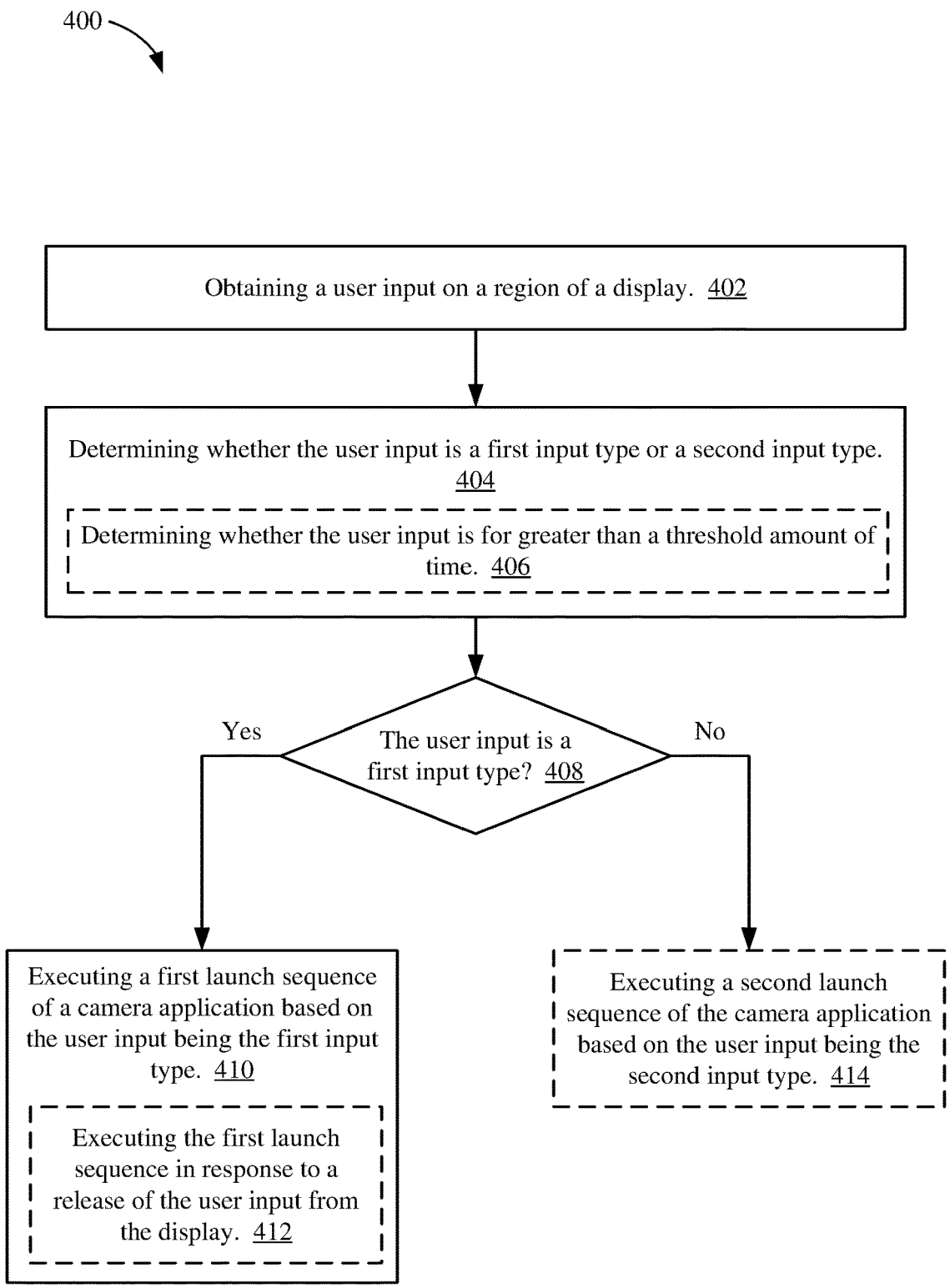
FIG. 4A is an illustrative flow chart depicting an example operation for executing a first launch sequence of a camera application.

As noted above, the device 300 may execute a launch sequence of a camera application based on a type of user input on the display 314. FIG. 4A is an illustrative flow chart depicting an example operation 400 for executing a first launch sequence. At 402, the device 300 obtains a user input on a region of a display 314. For example, referring to FIG. 1, the user may touch the region 116 including the camera application icon 114. In some implementations, the device 100 (in executing the operating system) organizes a home screen on the display into a grid so that each of a number of icons 110 may be displayed in each entry of the grid. Widgets 108 are displayed in one or more of the entries in the grid. In this implementation, the region 116 may include the entry in the grid displaying the camera application icon 114. The user touching the region 116 is associated with the user interacting with the camera application icon 114. As used herein, a user input on the region 116 may include a user pressing the region 116, the user swiping from, toward, or across the region 116, the user pressing and holding the region 116, the user tapping the region 116 multiple times (such as a double or triple tap), or any other suitable user interaction with the region 116 with a finger, stylus or other object.

Referring back to FIG. 4A, the device 300 determines whether the user input is a first input type or a second input type (404). Different input types may include a user tapping the display 314 (such as pressing on the display 314 for less than a threshold amount of time), the user performing a press and hold on the display 314 (such as pressing on the display 314 and remaining in contact with the display 314 for greater than the threshold amount of time), the user swiping across the display 314 (such as up, down, in an arc, and so on), and so on. As used herein, contacting the display 314 may include a physical touching of the display 314 or the user placing an object in close proximity of the display 314 (such as hovering a finger or other object within a threshold distance of the display 314).

The device 300 is configured to differentiate between different user inputs. For example, the device 300 may determine whether a user input is a swipe, an input on the region for less than a threshold amount of time (such as a tap on the region), an input on the region for greater than the threshold amount of time (such as a press and hold on the region), a double tap, and so on. In some implementations, the device 300 determines whether a user contact with the display 314 is a first input type or a second input type based on the length of time of the user contact with the display 314. For example, the device 300 determines whether the user input (such as a user contact with the display 314) is for greater than a threshold amount of time (406). In this manner, the device 300 may determine whether the user input is a tap on the display 314 (such as on the camera application icon to execute a second launch sequence to launch the camera application) or the user input is a press and hold on the display 314 (to cause the device 300 to execute a first launch sequence to launch the camera application). For example, if the user presses and holds on the region 116 (FIG. 1) for greater than a threshold amount of time, the device 100 executes the first launch sequence to launch the camera application.

The threshold may be any suitable length of time to differentiate between the two input types. For example, the threshold may correspond to an amount of time for a camera application graphical user interface to be displayed. In another example, the threshold may correspond to an amount of time for the device 300 to be ready to capture and process an image or video (with the camera 302 initialized and an image processing pipeline ready to process one or more image frames captured by the camera 302). A threshold corresponding to an amount of time may include the threshold equaling the amount of time or the threshold being a portion, factor, or other suitable comparison to the amount of time. In some other implementations, the threshold may be a unit other than time, such as an amount of pressure. For example, a user lightly pressing the region of the display 314 may cause the device 300 to execute one launch sequence, and the user pressing the region of the display 314 with more force may cause the device 300 to execute another launch sequence.

If the user input is a first input type (408), the device 300 executes a first launch sequence of a camera application (410). For example, if the user input is for greater than a threshold amount of time, the device 300 executes the first launch sequence. In some implementations, the device 300 captures an image or video without performing all operations associated with the camera application based on executing the first launch sequence. Operations that may be prevented from being performed in executing the first launch sequence include displaying a camera application GUI or a shutter button (and requiring the user to press the shutter button to capture an image or video), generating or displaying a preview of the scene for capture, performing one or more camera initialization operations (such as one or more of the 3A operations), initializing all cameras, initializing all camera sensors, and so on. In some implementations, the device 300 executes at least a portion of the first launch sequence in response to a release of the user input from the display 314 (412). For example, when the user presses and holds the region 116 (FIG. 1), the device 300 determines that the first launch sequence to launch the camera application is to be executed. The device 300 may then execute the first launch sequence in response to the release of the user input. In some other implementations, if the first launch sequence is for capturing an image or video, the device 300 may initialize a camera 302 in response to determining that a first launch sequence is to be executed (which may be before release of the user input). In this manner, the device 300 may be ready to capture an image or video in response to the user no longer contacting the region 116 (FIG. 1). The camera 302 may then capture an image or video in response to the user no longer contacting the region 116 (such as the user removing his or her finger from the region 116).

In some implementations, if the user input is not a first input type (408), the device 300 may execute the second launch sequence of the camera application based on the user input being a second input type (414). For example, if the device 300 determines that the user contacts the region 116 (FIG. 1) for less than the threshold amount of time, the device 300 may execute the second launch sequence of the camera application (such as illustrated in FIGS. 2A and 2B). The user may thus wait for the device to display the camera application GUI before capturing an image or video.

Execution of the first launch sequence may prevent one or more operations of the full camera application from being performed to accelerate capturing an image or video. In some implementations, the device 300 prevents the display 314 from displaying a preview. For example, a preview stream may require the cameras to be initialized with AF operations, auto-exposure operations, and other operations before the preview is displayed. Additionally, the preview stream may require one or more image processing filters (such as denoising, edge enhancement, contrast, AWB, and other filters) in the image processing pipeline (such as by the image signal processor 312) to be initialized and processing the images captured before the preview stream is displayed. As a result, the device 300 can require up to multiple seconds before providing a preview in the camera application GUI before a user can use the device 300 to capture an image or video. If the device 300 prevents a preview from being displayed or generated for the camera application based on executing the first launch sequence, the device 300 may more quickly capture an image or video. In some implementations, one or more default settings for initializing an image sensor or camera are used to capture an image or video, and one or more default settings for the image processing pipeline are used to process the captured image or video based on executing the first launch sequence. For example, a default AF setting or an auto-exposure setting may be used to capture an image, and a default AWB setting may be used to process the captured image. In this manner, a device 300 may be prevented from performing one or more initialization operations (such as one or more 3A operations) to typically determine an AF setting, an AWB setting, an auto-exposure setting, or other camera or image processing pipeline setting based on executing the first launch sequence, and the device 300 may capture and process an image or video without first performing such initialization operations.

In some implementations of the device 300 executing the different launch sequences, the processor 304 instructs the camera controller 310 to perform one or more operations. For example, the processor 304 instructs the camera controller 310 to initialize the camera 302 and one or more components of an image processing pipeline (such as an AWB filter of the image signal processor 312), capture an image or video (using the camera 302), and other suitable operations. The processor 304 may include one or more application processors configured to execute instructions 308 stored in memory 306 (such as one or more applications). The processor 304 may be coupled to different types of cameras and components based on the device 300. For example, one smartphone may include a different type of camera module than another smartphone (such as camera modules from different manufacturers, camera modules with different specifications or capabilities, and so on), but the two smartphones may include the same type of processor 304. In executing the camera application launch sequences, the processor 304 (such as one or more application processors) may generate general instructions that are not specific to a particular camera or imaging pipeline component. For example, the processor 304 may generate one or more general instructions to initialize a camera, and the processor 304 may provide the general instructions to the camera controller 310. The camera controller 310 may be configured to convert the general instructions received from the processor 304 to component specific instructions. In some implementations, the camera controller 310 uses a lookup table, directory, or other suitable mapping of general instructions to component specific instructions. The camera controller 310 may then perform the operations based on the component specific instructions. In some other implementations, the processor 304 and the camera controller 310 may be together in one processor, group of processors, an SoC, and so on. In this manner, one or more above operations may be performed by the processor 304 or the camera controller 310.

As noted above, executing the first launch sequence to launch the camera application may expedite capturing an image or video as compared to executing the second launch sequence. For example, multiple operations of the camera application that is performed based on executing the second launch sequence are not performed based on executing the first launch sequence.

Figure 4B:
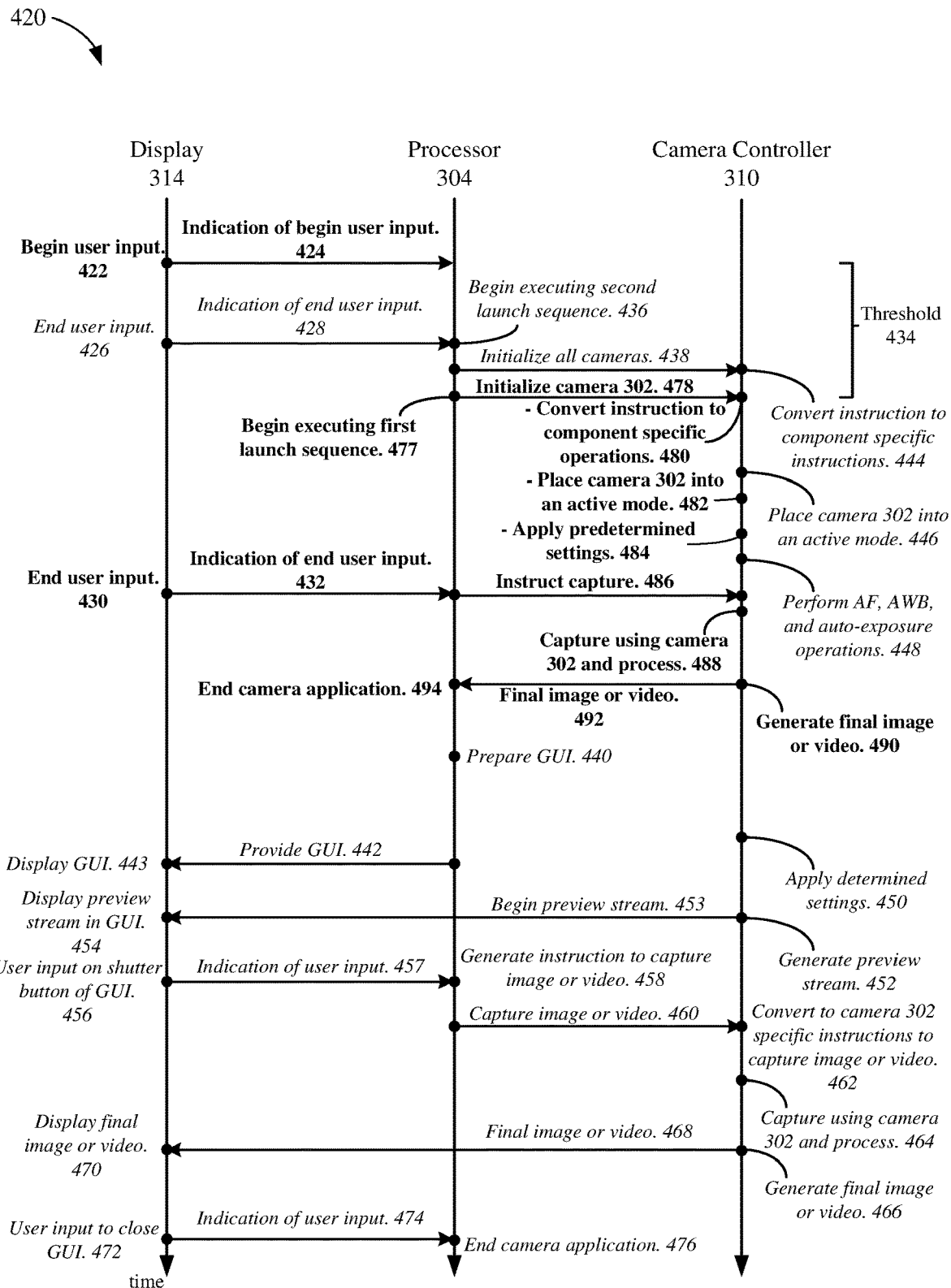
FIG. 4B is a timing diagram depicting a device executing a first launch sequence or a second launch sequence of a camera application.

FIG. 4B is a timing diagram 420 depicting a device 300 executing a first launch sequence and executing a second launch sequence to capture an image or video. The instructions and operations in in bold (and not in italics) indicate instructions and operations associated with an example first launch sequence. The instructions and operations in italics indicate instructions and operations associated with an example second launch sequence. As illustrated, the operations of the camera application based on executing the first launch sequence are a subset of the operations of the camera application based on executing the second launch sequence.

At 422, a display 314 begins obtaining a user input (such as a user contacting a region of the display 314). The display 314 may indicate the beginning of the user input to the processor 304 (424). The display 314 may also stop obtaining the user input at 426 (indicating the end of the user input to the processor 304 at 428) or at 430 (indicating the end of the user input to the processor 304 at 432). As illustrated, if the user input ends at 426 (such as the user removing a finger from the display 314), the user input is on the region of the display 314 for less than a threshold amount of time 434. If the user input ends at 430, the user input is on the region of the display 314 for greater than the threshold amount of time 434.

The processor 304 determines whether the user input is on the region of the display 314 for longer than the threshold 434. For example, the processor 304 may begin a timer or counter based on receiving the indication 424, and the timer or counter may be used to count to the threshold 434. If the indication 428 is received before the timer reaches the threshold 434, the processor 304 determines that the user input is a second input type. If the user input of the second input type is on the region 116 of a home screen including the camera application icon 114 (FIG. 1), the processor 304 may begin executing the second launch sequence (436). The processor 304 generates a plurality of instructions or otherwise causes a plurality of operations to be performed in executing the second launch sequence. For example, the processor 304 provides instructions to initialize all cameras to the camera controller 310 (438). The camera controller 310 converts the instructions to initialize all cameras to component specific instructions (444). For example, the camera controller 310 may generate instructions for each camera to place the camera into an active mode (such as remove the camera from a low power mode or provide power to the camera). The camera controller 310 may also generate additional instructions to initialize the cameras and image processing pipelines (such as for performing operations to place the cameras and the image processing pipelines into a state ready for capture and processing).

The camera controller 310 may place the camera 302 into the active mode (446). For example, the camera controller 310 may cause the device 300 to power on the camera 302 or remove the camera 302 from a low power mode, and the camera controller 310 may repeat the operations for each camera of the device. The camera controller 310 may then cause AF, AWB, and auto-exposure operations be performed in initializing the camera 302 and the image processing pipeline (448). Other initialization operations may be performed, such as charging a flash, initializing other processing filters, and so on. Settings for the camera and image processing pipeline are determined (such as an AF setting from the AF operation, an auto-exposure setting from the auto exposure operations, an AWB setting from the AWB operation, and so on), and the camera controller 310 causes the settings to be applied (450). For example, the camera controller 310 may instruct the camera 302 to adjust a lens position to apply an AF setting, the camera controller 310 may instruct the camera 302 to adjust an exposure window to apply an auto-exposure setting, and the camera controller 310 may apply an AWB setting for an AWB filter of the image signal processor 312.

The processor 304 may also prepare a GUI for the display 314 (440), and the processor 304 may provide the GUI to the display 314 (442). The display 314 may display the GUI for the camera application (443). The display 314 may not yet display a preview when displaying the GUI. The camera controller 310 may begin receiving a stream of captured images from the camera 302 and process the stream to begin generating a preview stream (452). At 453, the camera controller 310 may provide the preview stream to the display 314 (either directly or via the processor 304), and the display 314 may display the preview stream in the GUI (454). The device 300 then waits for a user input before capturing an image or video. For example, the device 300 obtains a user input on a shutter button of the GUI to indicate an image or video is to be captured (456).

The display 314 provides an indication of the user input to the processor 304 (457), and the processor 304 generates one or more instructions to capture the image or video (458). The processor 304 provides the instructions to the camera controller 310 (460), and the camera controller 310 converts the general instructions to capture an image or video to component specific instructions (462). The camera controller 310 then uses the camera 302 to capture the image or video and the image processing pipeline to process the image or video (464). In this manner, the camera controller 310 generates the final image or video (466). In some implementations, generating the preview stream does not include all filters of the image processing pipeline used to generate a final image or video. For example, a denoising filter, edge enhancement filter, color correction filter, and other filters may not be used to generate the preview stream. Generating the final image or video may include further processing the image or video using the filters not used for the preview stream.

The camera controller 310 provides the final image or video to the display 314 for user review (468), and the display 314 displays the final image or video (470). After the user reviews (or causes additional images or videos to be generated), the display 314 obtains a user input to close the GUI (472) indicating that the user wishes to end execution of the camera application. The display 314 indicates the user input to the processor 304 (474), and the processor 304 ends execution of the camera application (476). In this manner, the device 300 may be used for other applications. In some other implementations, execution of the camera application is placed into the background or otherwise adjusted so that the GUI is not displayed and the user may use the device for other applications.

The number of operations and time required for executing the operations of the second launch sequence in launching the camera application means that the user may wait too long before being able to capture an image or video. Therefore, a first launch sequence may be executed to quicken capturing an image or video. If the user input on the display (which began at 422) ends at 430 after threshold 434, the device 300 may execute a first launch sequence of the camera application. In some implementations, when the timer reaches the threshold 434, the processor 304 determines that the user input is a first input type. In some implementations, the processor 304 begins executing the first launch sequence at the end of the threshold 434 (477), and the device 300 is ready to capture an image or video in response to a release of the user input from the display 314. For example, the processor 304 may provide general instructions to the camera controller 310 to initialize camera 302 (478). In some implementations, the processor 304 instructs initialization of less cameras than initialized for the camera application based on executing the second launch sequence. For example, if the device 300 includes a primary and auxiliary camera, the processor 304 may instruct that the primary camera be initialized without initializing the auxiliary camera. Not requiring all cameras be initialized may quicken capturing an image or video as operations do not need to be repeated for each camera. In some implementations, the device 300 may initialize only a subset of image sensors. For example, the device 300 may initialize a first image sensor and prevent a second image sensor from being initialized.

The camera controller 310 may convert the general instructions from the processor 304 to initialize the camera 302 to component specific instructions (480), and the camera controller 310 may cause the camera 302 to be placed into an active mode (482). In some implementations, the camera controller 310 may cause one or more predetermined settings be applied in initializing the camera 302 (484). For example, instead of performing one or more of an AF operation, an auto-exposure operation, or an AWB operation, the camera controller 310 may provide one or more default settings to initialize the camera 302. The settings may be stored in memory 306 or another suitable memory. In this manner, the device 300 does not need to wait for the operations to finish before being able to capture an image or video. For example, when the camera 302 is initialized based on executing the second launch sequence, the camera 302 may make one or more measurements as to luminance, depth of objects, differences in depths, color contrasts and saturation, and so on. Three specific operations that are typically performed are an AF operation, an auto-exposure operation, and an AWB operation (which are based on measurements of phase, contrast, brightness, color cast, and so on when the camera 302 is initialized). For example, the camera 302 may perform contrast detection AF to determine a focal length. For contrast detection AF, the camera 302 requires a plurality of frames to determine the focal length. As a result, the user must wait those frames before the device 300 is able to capture an image or video. If the device 300 uses default settings to initialize the camera 302 and capture an image or video, the camera controller 310 may store or receive a default focal length setting to be used in capturing the image or video. In this manner, the AF operation is not performed, reducing the amount of time required before the camera 302 is ready to capture an image or video. The default settings (such as a default AF setting, AWB setting, auto-exposure (AE) setting, and so on) may be any suitable predetermined setting. For example, during device calibration, a device manufacturer may set the default settings based on camera testing in a clean room. In another example, a user may indicate one or more predetermined settings to be used in the future based on executing the first launch sequence.

Other means for quickening initialization of the camera 302 and the image processing pipeline not illustrated in FIG. 4B may be performed. In some implementations, the device 300 may prevent one or more image processing filters of the image signal processor 312 from being initialized. For example, one or more filters executed by the image signal processor 312 (such as denoising, color balance, edge enhancement, anti-aliasing, lens distortion correction, and so on) may not be used to process the image or video captured based on executing the first launch sequence. In this manner, the image or video may be generated faster than if captured and processed based on executing the second launch sequence.

The device 300 may be configured to capture an image or video in response to a user no longer contacting the display 314. For example, the device 300 may capture the image or video in response to the user lifting the finger from the region 116 of the display (FIG. 1). If the camera 302 and the image processing pipeline are already initialized (as illustrated in FIG. 4B), the device 300 is ready to capture the image or video. In some other implementations, the device 300 may begin executing the first launch sequence based on the end of the user input on the display 314. The device 300 may also be configured to use other suitable timings for performing operations associated with the first launch sequence, and the present disclosure is not limited to the illustrated timing diagram 420.

Referring back to FIG. 4B, the display 314 may end obtaining the user input (430). For example, the user may remove his or her finger from the region of the display 314. The display 314 provides an indication of the end of the user input to the processor 304 (432), and the processor 304 provides one or more instructions to the camera controller 310 to capture the image or video (486). The camera controller 310 may convert the general instructions to component specific instructions, and the camera controller 310 may cause the image or video to be captured using the camera 302 and processed using the image processing pipeline (488). The camera controller 310 may generate the final image or video (490), and provide the final image or video to the processor 304 (492). The final image or video may be stored in the memory 306 or provided to another suitable storage, and the processor 304 may end execution of the camera application (494). In some implementations, the device 300 indicates to the user that a first launch sequence is being or to be executed to launch the camera application. For example, the device 300 may provide a visual notification on the display 314 sometime during or before execution of the first launch sequence.

With only a subset of the operations associated with the camera application being performed based on executing the first launch sequence, capturing an image or video may be quickened. As illustrated in FIG. 4B, the camera controller 310 may be prevented from performing one or more operations associated with the camera application. For example, the processor 304 may prevent (such as not instruct) the camera controller 310 to initialize one or more cameras or image sensors, not perform one or more operations to initialize a camera when executing the camera application, and so on.

The example operations and instructions shown in FIG. 4B are to illustrate the time savings in executing the first launch sequence instead of the second launch sequence in launching the camera application to capture an image or video. The time reference is not to scale, and many of the operations may be simplified to not confuse aspects of the disclosure. As used herein, capturing an image or a video may be any suitable capture and processing by the device 300. In some implementations, image or video capture includes one or more of capture of still images, capture of video, capture of live images, or burst capture of images. A live image may be a defined size video clip (which may or may not include audio). An example live image may include an animated graphical interchange format (GIF). A burst capture may be a succession of image captures. For example, burst capture may include the camera 302 continuously capturing images for an amount of time.

In some implementations, the length of the live image capture, the length of the video recording, or the number of captures for burst capture may be based on a second user input to the device 300. For example, the user may again contact the display to end the captures or video recording. In another example, the device 300 may begin capture as soon as ready and before the user removes his or her finger from the region of the display 314. The device 300 may then end capture or recording in response to the user removing his or her finger from the region of the display 314. Any other suitable means for determining when and how to begin and end capture and recording may be performed (such as ending capture based on an audible command, a bezel squeeze, pressing the power button, and so on), and the present disclosure is not limited to the provided examples. Additionally, while the first launch sequence is described for FIG. 4B with reference to capturing an image or video, the first launch sequence may include other suitable operations.

FIG. 4B illustrates that one or more predetermined settings may be used in lieu of performing an operation to determine the setting. For example, one or more of the 3A operations may not be performed, and a predetermined setting may be used instead (such as a predetermined focus setting, a predetermined exposure setting, or a predetermined AWB setting). The device 300 may perform any (or none) of the operations and prevent the other operations from being performed (thus using predetermined settings for the bypassed operations). The device 300 may thus be ready to capture an image or video in a shorter amount of time.

In some other implementations, whether an operation is completed (such as one or more of the 3A operations being performed and completed to obtain settings for capture or processing) is based on when a user input is released from the display 314. As noted above, an image or video may be captured in response to a user releasing the input from the region of the display 314. For example, when the user removes his or her finger from a smartphone display, the smartphone may capture an image. The user input may be for a long enough time to perform one or more operations (such as one or more of the 3A operations). For example, the time between 477 and 430 may be sufficient to perform an AF operation to obtain an AF setting, perform an auto-exposure operation to obtain an exposure setting, perform an AWB operation to obtain an AWB setting, or perform any other suitable operations to obtain settings for preparing the camera 302 and the image processing pipeline for capture and processing.

In some implementations, the device 300 may be configured to either perform one or more of the 3A operations if the time between 477 and 430 is greater than a second threshold or use a predetermined setting if the time between 477 and 430 is less than the second threshold. The second threshold may be associated with a time required to perform the operation. For example, contrast detection AF may require up to 30 frames. After the stream of frame captures begins at the camera sensor, if the user input is released from the display 314 before 30 frames are captured, the device 300 may use a predetermined focus setting instead of performing the AF operation. In some implementations, the camera controller 310 may begin performing one or more of the operations (such as an AF operation, an AWB operation, and/or an auto-exposure operation). If the user input is for greater than the second threshold amount of time (and the second threshold amount of time is associated with the time to perform the one or more operations), the one or more operations are completed to obtain the settings to be used to capture and process an image or video. If the user input is for less than the second threshold amount of time (such as the user removing his or her finger from the display 314 while one or more operations are being performed by the device 300), the camera controller 310 may interrupt the one or more operations and use a predetermined setting for the interrupted operation. In this manner, scene specific settings may be determined and used to initialize the camera 302 or prepare the image processing pipeline if the user input is for greater than the second threshold amount of time. Also, image or video capture is not delayed with the use of predetermined settings for initialization and preparing the image processing pipeline when the user input is for a shorter duration than the second threshold amount of time.

FIGS. 5A-8 illustrate various implementations and operations based on executing a first launch sequence. As noted above, the device 300, based on executing the first launch sequence, may prevent a preview from being displayed on the display 314. For example, the portions of the camera application (or the second launch sequence) associated with generating and/or displaying a preview may not be included in the first launch sequence for execution. Additionally or alternatively, the device 300 may be configured to display a windowed preview or other indication that an image or video is to be captured based on executing the first launch sequence.

Figure 5A:
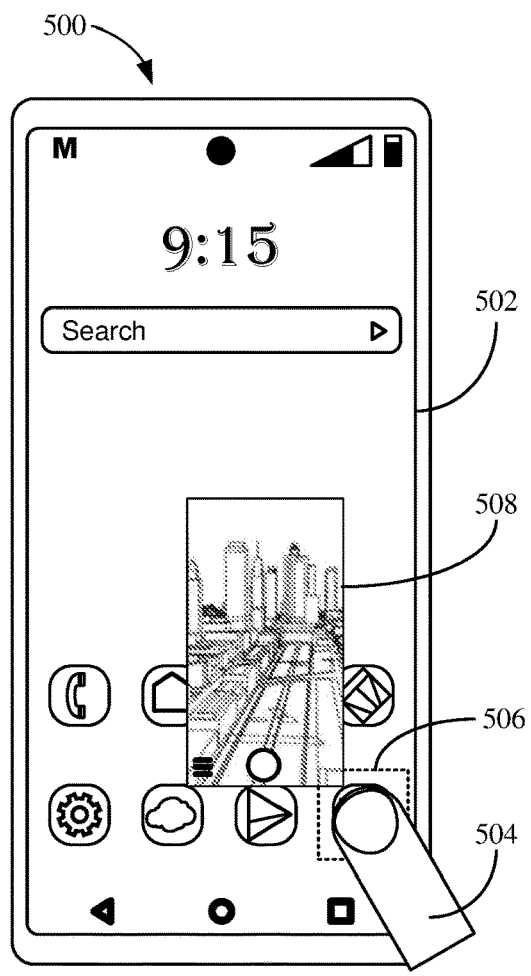
FIG. 5A is a depiction of a device displaying a windowed preview.

FIG. 5A is a depiction of a device 500 displaying a windowed preview 508 on the display 502 based on executing the first launch sequence. As shown, the user input 504 of the first input type on the region 506 of the display 502 causes the device 500 to execute the first launch sequence of the camera application. The windowed preview 508 may indicate to the user that the first launch sequence is being executed. In some implementations, the windowed preview 508 is a windowed resemblance of the camera application GUI that would be displayed if executing the second launch sequence. The windowed preview 508 may not include all of the functionality of the camera application GUI to accelerate capture of an image or video. In some other implementations, the windowed preview is a window displaying the scene to be captured (without the camera application GUI resemblance). If the image or video is to be captured in response to the user input being released from the region 506, the device 500 may capture the image or video associated with the windowed preview 508 in response to the user no longer contacting the region 506.

As noted above, various camera or device settings or characteristics of the capture (such as resolution, frame rate, whether video or image capture, and so on) may be predetermined by the user and/or the device manufacture for execution of the first launch sequence. In this manner, the device 500 accelerates capturing the image or video without waiting for the user to select, via the camera application GUI, whether an image or video is to be captured (and to select the characteristics of the capture to be used). A video capture may be for a predetermined amount of time (such as 15 seconds), or the video may be captured until the device receives another user input to stop the capture (such as the user again pressing the display, squeezing a bezel of the device, moving the phone to another orientation, performing a predefined movement of the device, and so on).

In some implementations, executing the first launch sequence causes the device to provide the user with an option to select a specific camera action be performed. For example, the processor 304 instructs the display 314 to display a menu. The menu includes a plurality of selectable entries associated with different camera actions, and the associated camera action may be performed by the device in response to the entry being selected from the menu.

Figure 5B:
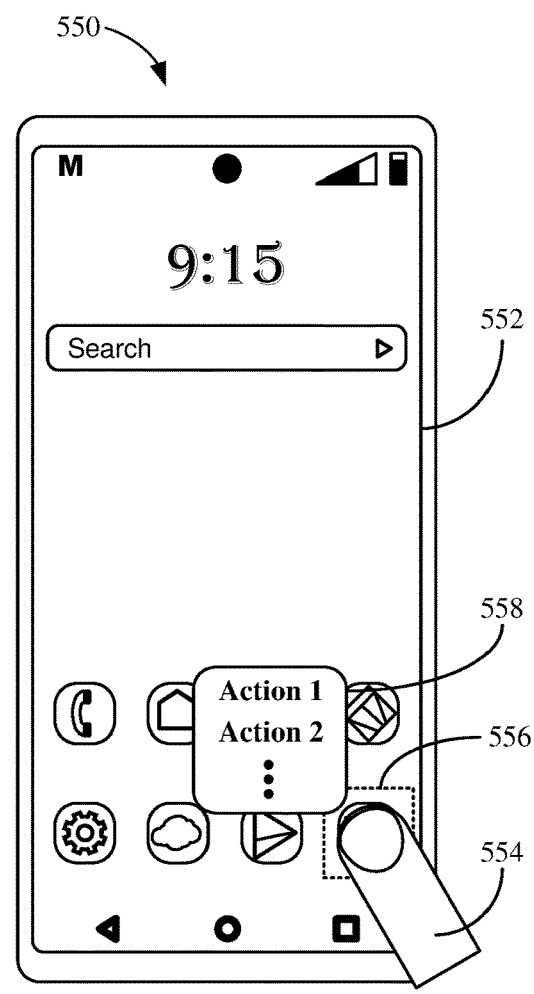
FIG. 5B is a depiction of a device displaying a menu.

FIG. 5B is a depiction of a device 550 displaying a menu 558 on a display 552 based on executing the first launch sequence. Displaying the menu 558 of entries is based on the user input 554 on the region 556 of the display 552 being a first input type (such as a press and hold for longer than a threshold amount of time). In some implementations, the menu 558 is displayed until the user selects one of the entries, presses a confirmation button, or other indication to close the menu 558. The menu 558 may also be removed from the display 552 after an amount of time that the user does not select one of the entries.

The camera actions associated with the entries may include executing the camera application (such as performing all of the operations or executing the second launch sequence), capturing an image using default settings for the camera 302, capturing an image using user custom settings for the camera 302, capturing a video using default settings for the camera 302, capturing a video using user custom settings for the camera 302, performing a burst capture using default settings for the camera 302, performing a burst capture using user custom settings for the camera 302, capturing a live image using default settings for the camera 302, capturing a live image using user custom settings for the camera 302, or any other suitable actions based on executing the first launch sequence. User custom settings, as used herein, may include any settings defined or set by the user before execution of the first launch sequence (such as during setup of the device 300). In some implementations, different camera actions may be associated with different cameras. For example, a first camera action may be for capturing an image using a front facing camera, and a second camera action may be for capturing an image using a rear facing camera.

The menu may be illustrated in any suitable manner (such as windowed or full-screen). Additionally, selection of an entry (associated with an action) may be in any suitable manner. For example, the user input 554 may be dragged to the displayed entry in the menu 558 before releasing the user input 554 from the display 552. In another example, the user input 554 may be released from the display 552 after the menu 558 is displayed, and the user may tap the entry to be selected in the menu 558. If the device 300 is to capture an image or video after the entry selection, the device 300 may or may not provide a preview to the user.

Figure 5C:
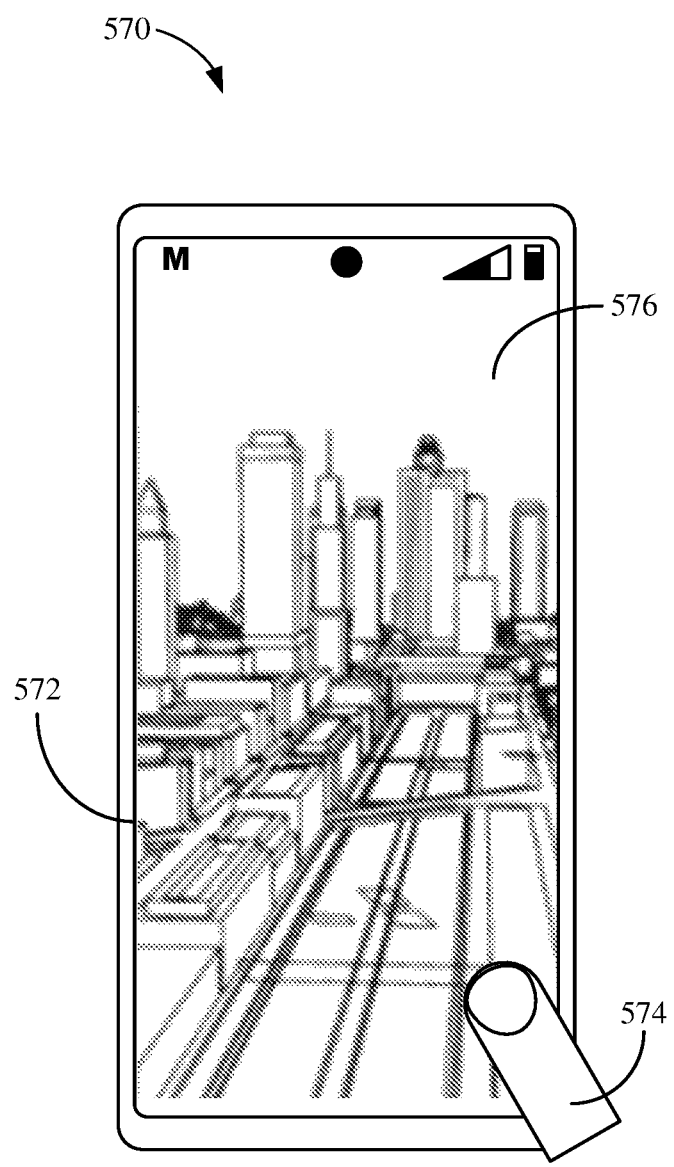
FIG. 5C is a depiction of a device displaying a preview.

Alternative to the device 500 providing a windowed preview 508 (FIG. 5A), the device may provide a full sized preview or other suitable preview to the user. FIG. 5C is a depiction of a device 570 displaying a preview 576 on a display 572 based on executing the first launch sequence. The preview 576 is provided by the device 570 based on the user input 574 being a first input type (such as pressing and holding the region of the display 572 including the camera application icon). The preview 576 may be similar to the preview provided based on executing the second launch sequence. In some other implementations, the display may not display the GUI for the camera application when displaying the preview. For example, the display 572, when displaying the preview 576, does not display a shutter button or settings that are part of the camera application GUI. In some implementations, the device 570 captures the image or video in response to the user input 574 being released from the display 572. In some other implementations, the device 570 captures the image or video in response to a second user input (such as a subsequent user touch on the display 572, a bezel squeeze, a press of the power button or other physical button, a movement of the device, an increased pressure of the first user input on the region of the display, an orientation of the device, and so on).

After the device 300 executes the first launch sequence (such as after capturing the image or video based on executing the first launch sequence), the device 300 may return to the operating instance before the first launch sequence was executed. For example, if the device 300 is displaying a home screen, the device 300 may end execution of the camera application (or place execution of the camera application in the background) and return to displaying the home screen. If a preview is not provided in capturing an image or video, the device 300 may display the home screen before, during, and after executing the first launch sequence of the camera application.

While example notifications of executing a first launch sequence may include visual notifications, such as a windowed preview, a menu, or a full size preview, any suitable notification of executing a first launch sequence may be provided to the user. For example, the display 314 may flash or provide another suitable visual notification. In another example, the device 300 may vibrate or perform another suitable haptic notification. In a further example, a speaker of the device 300 may provide a camera shutter sound (similar to when pressing the camera shutter button in the camera application GUI) or provide another audible notification.

As noted above, an operating system may be configured to display a grid of icons (and/or widgets) on a home screen. In this manner, a region of the display is associated with an icon. For example, referring back to FIG. 1, the region 116 of the display 102 is associated with the camera application icon 114. In some implementations, executing the first launch sequence is based on a user input on the region 116.

Additionally or alternatively, user inputs on different regions or different screens for the display 314 may cause the device 300 to execute the first launch sequence. In some implementations, a user input of a first input type on a locked screen may cause the device 300 to execute the first launch sequence. In some other implementations, a user input of a first type on the display 314 when the display 314 is in a low power mode may cause the device 300 to execute the first launch sequence.

Figure 5D:
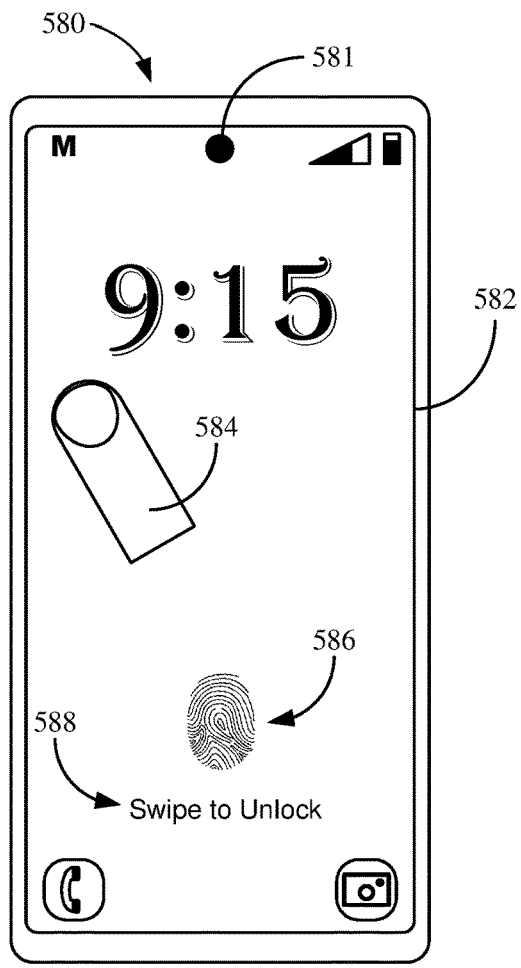
FIG. 5D is a depiction of a device displaying a lock screen.

FIG. 5D is a depiction of a device 580 displaying a lock screen on display 582. For example, when a device 580 is security protected, the display 582 may include a lock screen when the display 582 is turned on or after a period of user inactivity on the device 580. The lock screen may be associated with limited functionality of the device 580 until the user provides the required information to unlock the device 580 and remove the lock screen. For example, the device 580 may require a user input 584 (such as a swipe as instructed by instructions 588) for the display 582 to display a home screen. In some other examples, the device 580 may require a password, security pattern, or biometric data (such as a fingerprint 586 or facial recognition data captured by the camera 581) to remove the lock screen.

In some implementations, the device 580 may be configured to obtain a user input on the display 582 to cause a first launch sequence to be executed. For example, if the user contacts a region of the display 582 for greater than a threshold amount of time, the device 580 may execute the first launch sequence. The region may be any suitable region of the display 582. For example, if the bottom half of the display 582 is associated with a fingerprint sensor, a user input of a first type on the top half of the display may cause the device 580 to execute the first launch sequence. In another example, if the lock screen includes a camera application icon, a user input of a first type on the camera application icon may cause the device 580 to execute the first launch sequence.

Figure 5E:
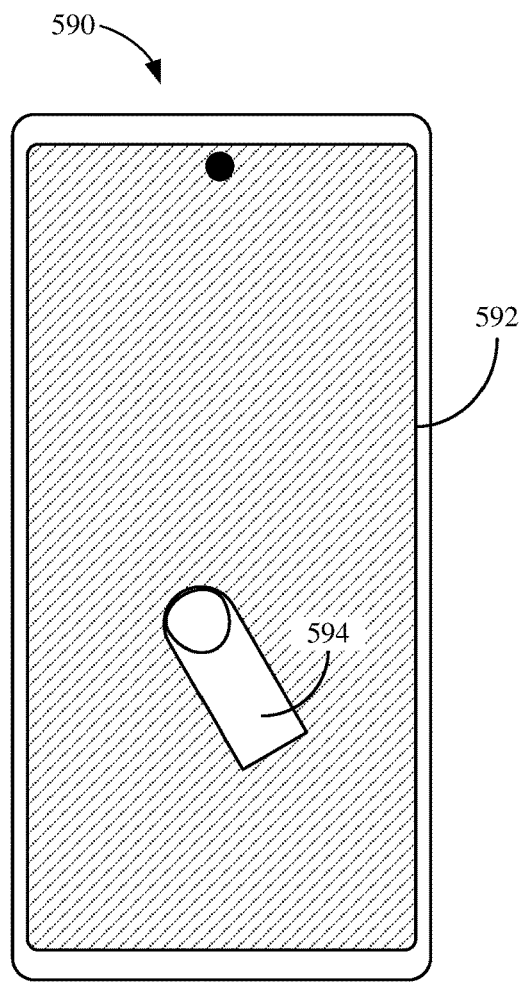
FIG. 5E is a depiction of a device including a display in a low power mode.

FIG. 5E is a depiction of a device 590 including a display 592 in a low power mode. To conserve power, the display 592 may stop displaying after a period of inactivity. Alternatively, an "always-on" display (such as organic light emitting diode (OLED)) displays less information (which may be at a lower brightness, fewer colors, less animations, and so on) to conserve power. The display 592 may be configured to obtain a user input when in the low power mode. For example, a user may contact the display 592 to cause the display 592 to display a lock screen (such as in FIG. 5D). In some implementations, the device 590 is configured to execute a first launch sequence based on a user input 594 being a first input type (such as longer than a threshold amount of time) on a region of the display in the low power mode. Therefore, the user is not required to remove the display 592 from the low power mode to display a lock screen, then unlock the device to remove the lock screen, and contact the display for a threshold amount of time when displaying the home screen. In this manner, executing the first launch sequence may be accelerated.

In some implementations, different portions or subregions of a region of a display may be associated with different actions for executing a first launch sequence. An operating system may be configured to display a grid of icons (and/or widgets) on a home screen (such as region 116 including camera application icon 114 in FIG. 1). In this manner, a region of the display is associated with an icon. In some implementations, different portions of the region 116 are associated with different actions.

Figure 6:
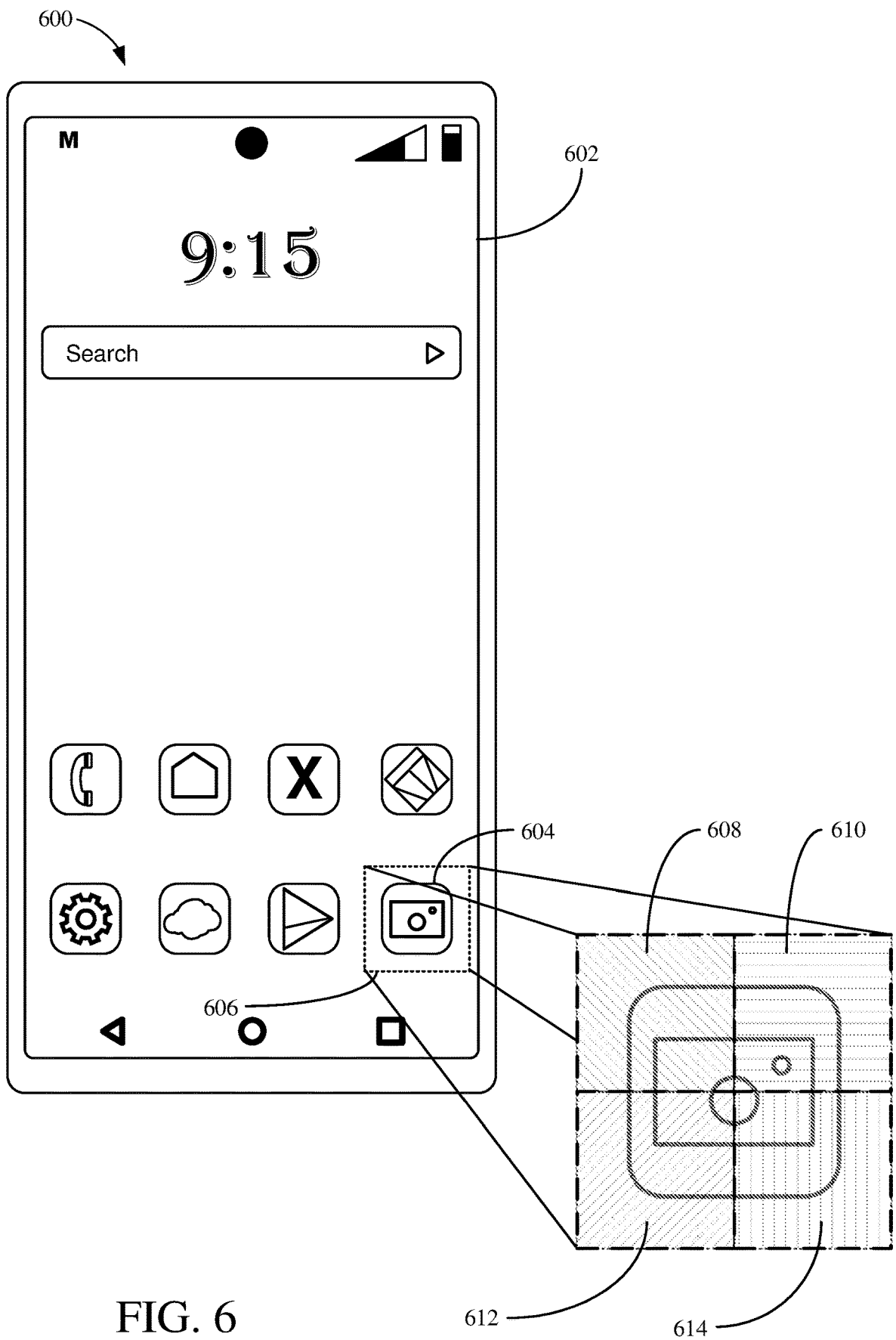
FIG. 6 is a depiction of a device displaying a region including a camera application icon, with the region including multiple subregions.

FIG. 6 is a depiction of a device 600 displaying, on a display 602, a region 606 including a camera application icon 604. The region 606 includes multiple subregions 608-614. In some implementations, each subregion 608-614 is associated with a different camera action. For example, the subregion 608 may be associated with a first camera action, the subregion 610 may be associated with a second camera action, the subregion 612 may be associated with a third camera action, and the subregion 614 may be associated with a fourth camera action. Example camera actions may be as noted above for the menu displayed based on executing a first launch sequence. For example, the camera actions may include executing the camera application (such as executing the second launch sequence), capturing an image using a specific set of settings different than the settings for capturing an image associated with a different camera action, capturing a video, and so on. In this manner, the device 600 is configured to perform a number of different camera actions for a first launch sequence equal to the number of subregions for the region 606. Additionally, one or more of the subregions may be associated with displaying a menu. The menu may include a plurality of selectable entries associated with different camera actions, and the associated camera action may be performed by the device 600 in response to the entry being selected from the menu. In this manner, the device 600 is configured to perform a number of different camera actions for a first launch sequence more than the number of subregions for the region 606. In some implementations, the device 600 stores variations of the first launch sequence based on the different configurations of camera actions for the different subregions. While four subregions 608-614 are illustrated, any number of subregions may exist for the region 606. Additionally, the subregions may be arranged with reference to one another in any suitable manner (such as vertically, horizontally, diagonally, in quadrants, and so on). While the subregions are illustrated with reference to a region including a camera application icon, subregions may exist for different screens or regions of the display. For example, a portion of the display when displaying a lock screen or when in a low power mode may be divided into different subregions.

In some other implementations, different camera actions may be based on different input types for the user input on the display. For example, a swipe in one direction may be associated with a first camera action, a press and hold may be associated with a second camera action, a swipe in a different direction may be associated with a third camera action, a double tap may be associated with a fourth camera action, and so on. In this manner, different camera actions may be performed based on the input type.

As noted above, when the second launch sequence of the camera application is executed, multiple cameras (and multiple image sensors) may be initialized. For example, a smartphone may include a rear facing primary image sensor and auxiliary image sensor and/or a front facing primary image sensor and auxiliary image sensor. In initializing the image sensors when executing the second launch sequence of the camera application, both the primary and auxiliary image sensors are initialized. In some implementations, both front facing and rear facing image sensors are initialized based on executing the second launch sequence. Initializing an image sensor may include performing an AF operation, performing an auto-exposure operation, performing an AWB operation, determining a gain for the image sensor's captured images, and so on. As a result, initializing multiple image sensors requires repeating the operations for each image sensor, which may delay the device from capturing an image or video using one of the image sensors.

In some implementations, the device 300 may initialize only a subset of image sensors based on executing the first launch sequence than would be initialized if executing the second launch sequence. For example, the device 300 may initialize a first image sensor and prevent initialization of a second image sensor based on executing the first launch sequence. In initializing fewer image sensors, the device 300 may reduce the amount of time before the device 300 can capture an image or video using the one or more initialized image sensors.

Figure 7A:
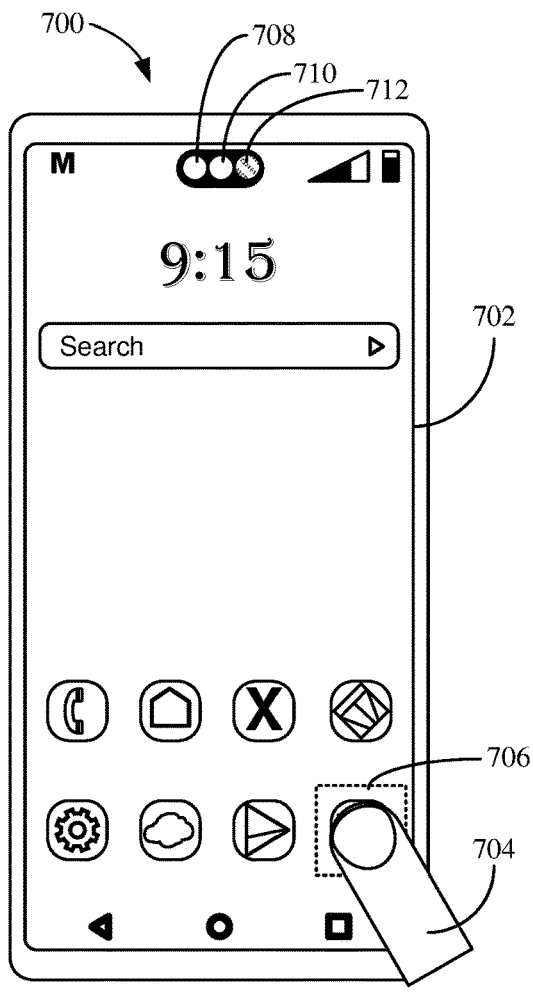
FIG. 7A is a depiction of a device including multiple front facing cameras.

FIG. 7A is a depiction of a device 700 including multiple front facing cameras 708 and 710. For example, the camera 708 may be a primary camera including a first image sensor and the camera 710 may be an auxiliary camera including a second image sensor. When the user input 704 is a first input type on a region 706 (including a camera application icon) of the display 702, the device 700 may execute the first launch sequence. Based on executing the first launch sequence, the device 700 may initialize the first image sensor and prevent the second image sensor from being initialized. The second image sensor may be used by the device 700 to generate a bokeh effect, determine a depth for an AF operation, or other operations of the camera application (which may be based on executing the second launch sequence). In another example implementation, the first image sensor (of the camera 708) may be associated with a field of view (FOV) for portraits, and the second image sensor (of the camera 710) may be associated with a wider FOV. Enabling both image sensors when executing the second launch sequence may allow for the device 700 to switch between image sensors for adjusting an FOV of images or video. If device 700, based on executing the first launch sequence, is configured to capture a portrait selfie image, the device 700 may initialize the first image sensor to be used to capture the selfie image and prevent initialization of the second image sensor.

In some implementations, the device 700 includes a third image sensor or camera 712 (or additional image sensors). The first image sensor and the second image sensor may be RGB image sensors (such as attached to an RGB or other suitable color filter array (CFA)), and the third image sensor may be a non-RGB image sensor (such as not attached to a CFA). For example, the third image sensor may be a depth sensor (such as a sensor configured to receive infrared or other suitable visible or non-visible light). The depth sensor may be used to determine depths of objects in the FOV of the first image sensor. The third image sensor may thus be used in performing an AF operation for the first image sensor, facial recognition for security applications, or other device operations. In some implementations, the device 700 initializes the first image sensor and the third image sensor and prevents initializing the second image sensor based on executing the first launch sequence. The device 700 may include any number of front-facing image sensors, and each image sensor may be of any suitable type (such as black and white, infrared, RGB, and so on), with at least one image sensor being prevented from being initialized based on executing the first launch sequence.

Figure 7B:
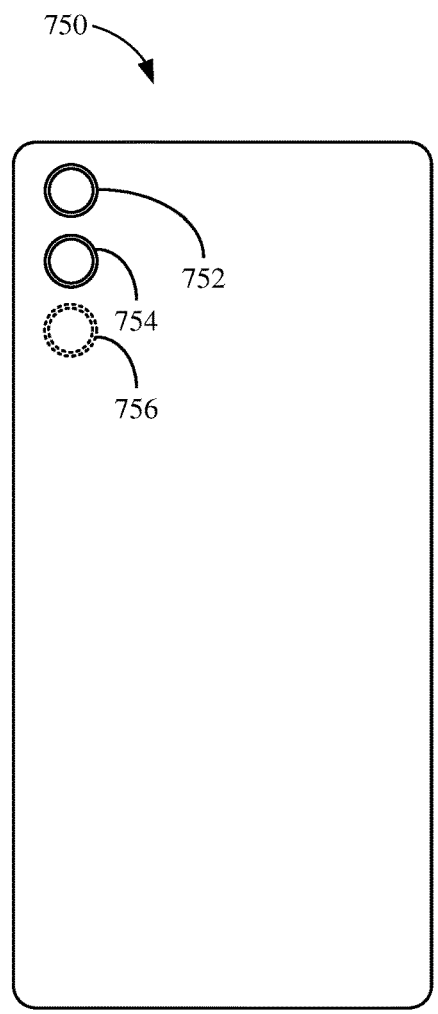
FIG. 7B is a depiction of a device including multiple rear facing cameras.

FIG. 7B is a depiction of a device 750 including multiple rear facing cameras 752 and 754. Based on executing the first launch sequence, the device 750 may be configured to initialize a first image sensor of the camera 752 (such as for a primary camera or a predefined FOV camera for capturing an image or video) and prevent initialization of a second image sensor of the camera 754 (such as for a secondary camera or a predefined FOV camera not for capturing the image or video). Similar to FIG. 7A, the device 700 may include a third image sensor or camera 756. The image sensors may be any suitable types of image sensors, and the device 750 may include more or fewer image sensors than illustrated. For example, the first image sensor and the second image sensor may be RGB sensors, and the third image sensor may be a non-RGB sensor (such as a depth sensor). In some implementations, the device 700 or the device 750 may prevent other components from being initialized based on executing the first launch sequence, such as a flash, a depth sensor for AF operations, the third image sensor, and so on.

In some implementations, the device 700 or 750 prevents a second image sensor from being initialized only for a defined amount of time. For example, the device 700 or 750 may delay initialization of the second image sensor. When the device executes the first launch sequence, the device may capture an image or video without initializing all of the image sensors. However, the device may continue to capture images or videos. Therefore, the device may initialize the second image sensor after an amount of time of preventing initialization of the second image sensor.

In some other implementations, the device may prioritize initializing a first image sensor to be ready to capture an image or video based on executing the first launch sequence. In this manner, the device may delay initializing the second image sensor until after initializing the first image sensor. An image or video may be captured using the first image sensor before the second image sensor is initialized. However, if enough time passes before image or video capture, the device may initialize the second image sensor, too. If the second image sensor is configured for AF operations for the first image sensor, the second image sensor is configured for generating bokeh effects for images from the first image sensor, or the second image sensor may otherwise be configured for use to affect images captured by the first image sensor, the device may provide a choice of such actions to the user based on executing the first launch sequence. For example, generating a bokeh effect image may be an action associated with an entry in a menu (such as menu 558 in FIG. 5B). However, the entry is not selectable until the second image sensor is initialized. Once the second image sensor is initialized, the entry may become selectable, with the device generating a bokeh effect image. In another example, if the second image sensor is used for an AF operation for a first image sensor, a predetermined or default focus setting may be applied in initializing the first image sensor until the second image sensor is initialized. Once the second image sensor is initialized, the device may perform the AF operation for the first image sensor to determine a focus setting to be applied.

In some implementations, initializing the second image sensor after being prevented from being initialized is based on one or more criteria, which may include: the user input on the region of the display being for greater than an amount of time defined to prevent the second image sensor from being initialized (such as a user contact with the region of the display being for longer than the delay to initialize the second image sensor); the first image sensor not used to capture an image or video during the time defined to prevent the second image sensor from being initialized; or a second user input not being obtained by the device during the time. For example, a second user input (such as a second input on the display, a bezel squeeze, a change in pressure for the first user input, pressing a button, adjusting an orientation or otherwise moving the device, and so on) may be obtained by the device to confirm that an image or video is to be captured. If the second user input is received when the second image sensor is prevented from being initialized, the device may capture an image or video using the first image sensor without initializing the second image sensor. However, if the second user input is received after the time the second image sensor is prevented from being initialized, the initialized first image sensor and the initialized second image sensor (such as for a bokeh effect, AF operation, or other suitable action) may be used to capture the image or video.

While executing a first launch sequence may be based on a user input on the display 314 being a first input type (such as a press and hold on a region of the display 314), the device 300 may be configured to prevent accidental or unintentional user inputs from triggering execution of a first launch sequence. For example, referring back to FIG. 1, if the camera application icon 114 is in a lower corner of the display 102, a user's thumb, palm, or other item may come in contact with the region 116. If the device 100 identifies the incidental contact as a first input type (such as the palm resting on the region 116 for greater than the threshold amount of time), the device 100 may execute the first launch sequence.

In some implementations, the device 300 is configured to receive a second user input to confirm that the first launch sequence is to be executed (or to capture an image or video based on executing the first launch sequence). In this manner, executing the first launch sequence (or capturing an image or video) may be (i) based on a first user input being a first input type on a region of the display 314 (such as a region including the camera application icon, a region of a lock screen, and so on) and (ii) in response to receiving the second user input to confirm.

Figure 8:
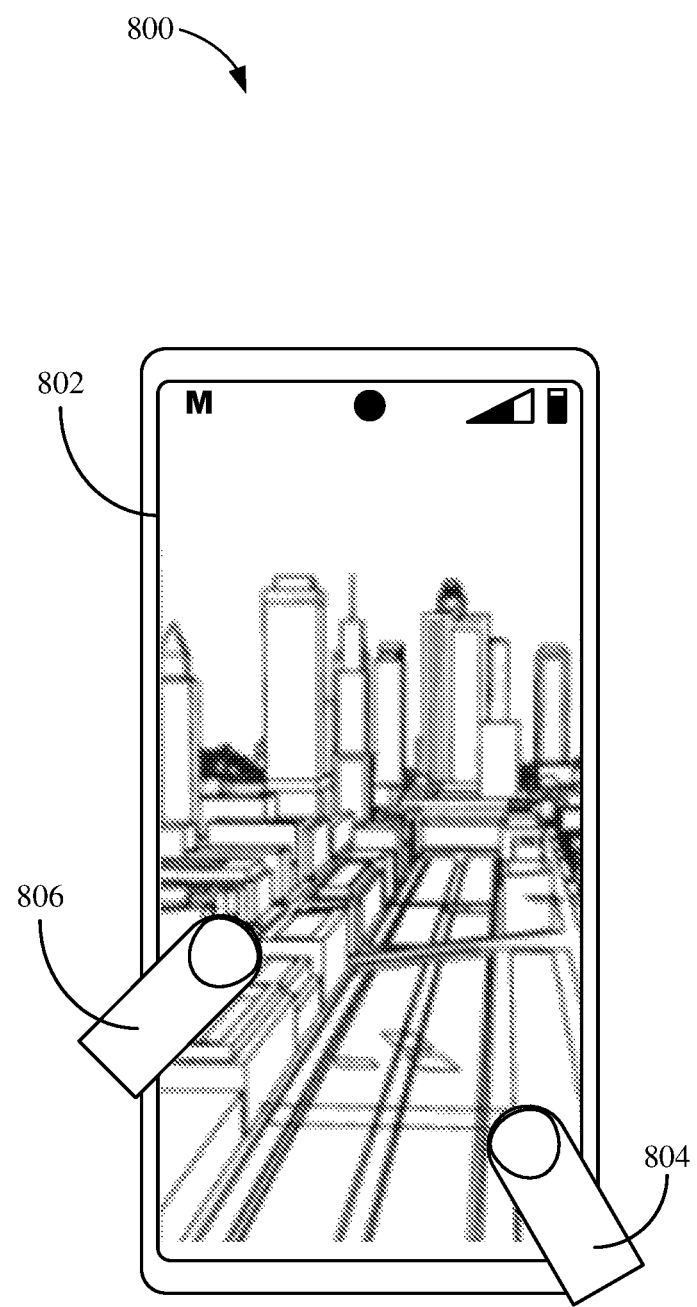
FIG. 8 is a depiction of a device configured to capture an image or video in response to receiving multiple user inputs.

FIG. 8 is a depiction of a device 800 configured to capture an image or video based on executing the first launch sequence in response to receiving multiple user inputs 804 and 806. A first user input 804 may be a press and hold on a region of the display 802 (such as a region including the camera application icon). The device 800 may display a preview (such as similar to device 570 in FIG. 5C). In some other implementations, the device 800 may display a windowed preview or otherwise indicate execution of the first launch sequence. The device 800 may then receive a second user input 806 to confirm that the first launch sequence is to be executed (or an action based on executing the first launch sequence is to be performed, such as capturing an image or video), and the device 800 performs the action or executes the first launch sequence in response. For example, with the device 800 displaying a preview based on executing the first launch sequence, the device 800 captures an image or video in response to obtaining the second user input 806.

The second user input may be any suitable user input to the device 800. For example, the second user input may include a squeeze of the device's bezel, a defined movement of the device, an increased pressure of the first user input on the region of the display, a user press of a physical button (such as a power button, a volume button, or other suitable mechanical interface), a defined orientation of the device, or a second user input on the display. For a defined movement, the device 300 may associate a specific movement with confirming performing an action based on executing the first launch sequence or executing the first launch sequence itself. Example device movements include shaking the device, chopping the device, quickly rotating the device, tapping the device, and so on.

For a defined orientation, the device 300 may typically be used at an angle (such as 60 degrees from the azimuth when texting or reading). Additionally, images or video are typically captured with the device 300 oriented perpendicular to the azimuth. Orienting the device 300 perpendicular to the azimuth may be a second user input. In another example, the device 300 may typically be used in a portrait orientation for texting, reading, phone calls, and so on. Orienting the device 300 in a landscape orientation may be a second user input.

The device 300 may be oriented before or after the first user input. For example, the device 300 may be oriented (such as a smartphone in a portrait orientation or a landscape orientation), and the first user input may be obtained after orienting the device 300. In this manner, the device 300 may use the orientation to confirm that the first user input is to be compared to the threshold (to determine whether the first user input is a first input type or a second input type). For example, if the device 300 is oriented in a landscape mode, the device 300 determines whether the first user input is the first input type or the second input type. If the device 300 is oriented in a portrait mode, the device 300 may assume that the first user input is the second input type (to perform a second launch sequence). As noted above, if orienting the device 300 is after the first user input, the orientation of the device 300 may be the second user input.

Any suitable second user input on the display may be configured. For example, referring to FIG. 5A, the second user input may be a user contact on the shutter button of the windowed preview 508 (or alternatively a user contact on the portion of the display 502 including the windowed preview 508). In another example, the second user input may be a swipe or other predefined movement while contacting the display. The second user input may also be a non-contact input with the device, including an audible input (such as a voice command) or a visual input (such as based on facial recognition or eye tracking). For example, the user may state a defined phrase to cause the device to execute the first launch sequence or perform one or more operations based on executing the first launch sequence. An audible input may also be based on the device matching the voice to the user. In another example, the user may look at a windowed preview or otherwise look at the display as a second input. For example, referring back to FIG. 1, the device 100 may use the camera 104 and eye tracking means to determine that the user is looking at the display 102. Such determination may be used as the second user input.

As described herein, a device may be configured to execute a first launch sequence of a camera application based on a user input. While some examples are illustrated, the disclosure is not limited to the provided examples. For example, while the camera application icon is illustrated as being displayed on a home screen of an operating system for a device, the camera application icon may be displayed on a lock screen or other suitable screen. In this manner, a region of the display for a lock screen or other screen may be used to receive a user input of a first input type to execute a first launch sequence. Additionally, the region of the display for receiving the user input may not be associated with a camera application icon (such as during a lock screen or when the display is in a low power mode). Furthermore, while the illustrations show a smartphone as the example device performing the described operations, any suitable apparatus may be used to perform the operations (such as a tablet, a digital camera, a system on chip (SoC), a laptop computer, and so on).

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 306 in the example device 300 of FIG. 3) comprising instructions 308 that, when executed by the processor 304

(or the camera controller 310 or the image signal processor 312 or another suitable component), cause the device 300 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 304 or the image signal processor 312 in the example device 300 of FIG. 3. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As noted above, while the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. For example, while a user input is described as being a first input type or a second input type, the user input may be categorized into any number of input types. In another example, while a second user input is described for confirming the first launch sequence (or one or more operations based on executing the first launch sequence), any number of inputs may be used. Accordingly, the disclosure is not limited to the illustrated examples, and any means for performing the functionality described herein are included in aspects of the disclosure.

What is claimed is:

1. A method, comprising:
    obtaining a first user input on a region of a display;
    determining, by a processor, whether the first user input is a first input type or a second input type, wherein:
        the first input type is the first user input on the region of the display for greater than a first threshold amount of time; and
        the second input type is the first user input on the region of the display for less than the first threshold amount of time; and
    executing, by the processor, a first launch sequence of a camera application based on the first user input being the first input type, wherein executing the first launch sequence causes the device to one or more of:
        initialize the camera using a predetermined focus setting based on a determination that the first user input of the first input type is on the region of the display for less than a second threshold amount of time that is greater than the first threshold amount of time or using a focus setting determined using an autofocus operation based on a determination that the first user input of the first input type is on the region of the display for greater than the second threshold amount of time;
        initialize the camera using a predetermined exposure setting based on a determination that the first user input of the first input type is on the region of the display for less than the second threshold amount of time or using an exposure setting determined using an autoexposure operation based on a determination that the first user input of the first input type is on the region of the display for greater than the second threshold amount of time; or
        configure an automatic white balance (AWB) filter of an image signal processor using a predetermined AWB setting based on a determination that the first user input of the first input type is on the region of the display for less than the second threshold amount of time or using an AWB setting determined using an AWB operation based on a determination that the first user input of the first input type is on the region of the display for greater than the second threshold amount of time.

2. The method of claim 1, further comprising executing, by the processor, a second launch sequence of the camera application based on the first user input being the second input type.

3. The method of claim 2, further comprising:
    displaying a camera application graphical user interface on the display in response to executing the second launch sequence; and
    obtaining a user input via the camera application graphical user interface.

4. The method of claim 1, wherein executing the first launch sequence is in response to a release of the first user input from the region of the display.

5. The method of claim 1, further comprising displaying, on the display, a lock screen before obtaining the first user input, wherein the first user input is on the lock screen.

6. The method of claim 1, wherein obtaining the first user input includes obtaining the first user input on the display when the display is in a low power mode.

7. The method of claim 1, further comprising:
    displaying, on the display, a home screen including one or more icons before obtaining the first user input, wherein the one or more icons includes a camera application icon in the region of the display.

8. The method of claim 1, wherein executing the first launch sequence causes the display to display a menu, the menu including two or more selectable entries, wherein each selectable entry is associated with one or more operations consisting of one or more of:
   executing the camera application;
   capturing an image using default settings for a camera;
   capturing an image using user custom settings for the camera;
   capturing a video using default settings for the camera;
   capturing a video using user custom settings for the camera;
   performing a burst capture using default settings for the camera;
   performing a burst capture using user custom settings for the camera;
   capturing a live image using default settings for the camera; or
   capturing a live image using user custom settings for the camera.

9. The method of claim 8, further comprising:
   obtaining a selection of one of the selectable entries; and
   performing the one or more operations associated with the selection in response to obtaining the selection.

10. The method of claim 1, wherein executing the first launch sequence causes a device including the display and the processor to:
   instruct a camera controller coupled to the processor to capture an image or video using a camera; and
   prevent the camera controller from performing one or more operations of the camera application.

11. The method of claim 10, further comprising capturing, by the camera, the image or video in response to a release of the first user input of the first input type from the region of the display.

12. The method of claim 10, further comprising:
   obtaining a second user input; and
   capturing, by the camera, the image or video in response to obtaining the second user input and based on the first user input being the first input type.

13. The method of claim 12, wherein the second user input includes one or more of:
   a bezel squeeze;
   a movement of the device;
   an increased pressure of the first user input on the region of the display;
   a user press of a physical button;
   an orientation of the device; or
   another user input on the display.

14. The method of claim 10, further comprising:
   determining an orientation of the device before obtaining the first user input, wherein executing the first launch sequence is also based on the orientation being a first orientation.

15. The method of claim 10, further comprising preventing the display from displaying a preview of the image or video to be captured based on the first user input being the first input type.

16. The method of claim 15, wherein preventing the display from displaying the preview includes preventing generating the preview.

17. The method of claim 16, wherein the first launch sequence excludes one or more operations of a second launch sequence associated with generating the preview.

18. The method of claim 10, wherein executing the first launch sequence causes the display to display a windowed preview of the image or video to be captured.

19. The method of claim 10, wherein executing the first launch sequence causes the device to:
   initialize a first image sensor; and
   prevent a second image sensor from being initialized.

20. The method of claim 19, wherein executing the first launch sequence causes the device to initialize a third image sensor.

21. The method of claim 20, wherein:
   the first image sensor and the second image sensor are RGB image sensors; and
   the third image sensor is a non-RGB image sensor.

22. The method of claim 19, wherein executing the first launch sequence causes the device to initialize the second image sensor an amount of time after preventing the second image sensor from being initialized.

23. The method of claim 22, wherein initializing the second image sensor is based on one or more of:
   the first user input on the region of the display for greater than the amount of time after preventing the second image sensor from being initialized;
   the first image sensor not capturing an image or video during the amount of time; or
   the device not obtaining a second user input during the amount of time.

24. The method of claim 1, further comprising:
   based on the first user input of the first input type being on the region of the display for greater than the second threshold amount of time that is greater than the first threshold amount of time, performing one or more of:
      the autofocus operation to determine the focus setting and initialize the camera using the determined focus setting;
      the autoexposure operation to determine the exposure setting and initialize the camera using the determined exposure setting; or
      the AWB operation to determine an AWB setting and configure the AWB filter using the determined AWB setting.

25. The method of claim 1, wherein the second threshold amount of time is based on a time to perform one or more of:
   the autofocus operation;
   the autoexposure operation; or
   the AWB operation.

26. The method of claim 1, further comprising:
   based on the first user input of the first input type being on the region of the display for less than the second threshold amount of time, performing one or more of:
      interrupting the autofocus operation and initializing the camera using the predetermined focus setting;
      interrupting the autoexposure operation and initializing the camera using the predetermined exposure setting; or
      interrupting the AWB operation and initializing the AWB filter using the predetermined AWB setting.

27. The method of claim 1, further comprising obtaining a second user input on the region of the display, wherein:
   the first user input and the second user input are the first input type;
   the first user input is on a first subregion of the region of the display;
   the second user input is on a second subregion of the region of the display;

execution of the first launch sequence based on the first user input causes a device including the display and the processor to capture a first image by a camera; and execution of the first launch sequence based on the second user input causes the device to perform one of:

capturing a second image by the camera using settings different than for capturing the first image by the camera;

capturing a video by the camera; or displaying a menu.

28. The method of claim 1, wherein the camera application includes a video application.

29. An apparatus, comprising:

a display configured to obtain a first user input on a region of the display;

a memory; and a processor coupled to the memory, the processor configured to:

determine whether the first user input is a first input type or a second input type, wherein:

the first input type is the first user input on the region of the display for greater than a first threshold amount of time; and the second input type is the first user input on the region of the display for less than the first threshold amount of time; and execute a first launch sequence of a camera application based on the first user input being the first input type, wherein, to execute the first launch sequence, the processor is configured to cause the apparatus to one or more of:

initialize the camera using a predetermined focus setting based on a determination that the first user input of the first input type is on the region of the display for less than a second threshold amount of time that is greater than the first threshold amount of time or using a focus setting determined using an autofocus operation based on a determination that the first user input of the first input type is on the region of the display for greater than the second threshold amount of time;

initialize the camera using a predetermined exposure setting based on a determination that the first user input of the first input type is on the region of the display for less than the second threshold amount of time or using an exposure setting determined using an autoexposure operation based on a determination that the first user input of the first input type is on the region of the display for greater than the second threshold amount of time; or configure an automatic white balance (AWB) filter of an image signal processor using a predetermined AWB setting based on a determination that the first user input of the first input type is on the region of the display for less than the second threshold amount of time or using an AWB setting determined using an AWB operation based on a determination that the first user input of the first input type is on the region of the display for greater than the second threshold amount of time.

30. The apparatus of claim 29, wherein the processor is further configured to execute a second launch sequence of the camera application based on the first user input being the second input type.

31. The apparatus of claim 30, wherein the display is configured to:

display a camera application graphical user interface on the display in response to executing the second launch sequence; and obtain a user input via the camera application graphical user interface.

32. The apparatus of claim 29, wherein the processor is configured to execute the first launch sequence in response to a release of the first user input from the region of the display.

33. The apparatus of claim 29, wherein the display is configured to display a lock screen before obtaining the first user input, wherein the first user input is on the lock screen.

34. The apparatus of claim 29, wherein the display is configured to obtain the first user input when the display is in a low power mode.

35. The apparatus of claim 29, wherein the display is further configured to:

display a home screen including one or more icons before obtaining the first user input, wherein the one or more icons includes a camera application icon in the region of the display.

36. The apparatus of claim 29, further comprising a camera, wherein executing the first launch sequence causes the display to display a menu, the menu including two or more selectable entries, wherein each selectable entry is associated with one or more operations consisting of one or more of:

executing the camera application;

capturing an image using default settings for the camera;

capturing an image using user custom settings for the camera;

capturing a video using default settings for the camera;

capturing a video using user custom settings for the camera;

performing a burst capture using default settings for the camera;

performing a burst capture using user custom settings for the camera;

capturing a live image using default settings for the camera; or capturing a live image using user custom settings for the camera.

37. The apparatus of claim 36, wherein:

the display is configured to obtain a selection of one of the selectable entries; and the apparatus is configured to perform the one or more operations associated with the selection in response to obtaining the selection.

38. The apparatus of claim 29, further comprising a camera controller coupled to the processor, wherein executing the first launch sequence causes the apparatus to:

instruct the camera controller to capture an image or video using a camera; and prevent the camera controller from performing one or more operations of the camera application.

39. The apparatus of claim 38, further comprising the camera configured to capture the image or video in response to a release of the first user input of the first input type from the region of the display.

40. The apparatus of claim 38, wherein the camera is configured to capture the image or video in response to obtaining a second user input by the apparatus and based on the first user input being the first input type.

41. The apparatus of claim 40, wherein the second user input includes at one or more of:

a bezel squeeze;
a movement of the apparatus;
an increased pressure of the first user input on the region of the display;
a user press of a physical button of the apparatus;
an orientation of the apparatus; or
another user input on the display.

42. The apparatus of claim 38, wherein:
the apparatus is configured to determine an orientation of the apparatus before obtaining the first user input; and
executing the first launch sequence is also based on the orientation being a first orientation.

43. The apparatus of claim 38, wherein the display is configured to prevent displaying a preview of the image or video to be captured based on the first user input being the first input type.

44. The apparatus of claim 43, wherein the processor is further configured to prevent generating the preview to prevent the display from displaying the preview.

45. The apparatus of claim 44, wherein the first launch sequence excludes one or more operations of a second launch sequence associated with generating the preview.

46. The apparatus of claim 38, wherein the display is configured to display a windowed preview of the image or video to be captured based on executing the first launch sequence.

47. The apparatus of claim 38, further comprising:
a first image sensor configured to be initialized based on executing the first launch sequence; and
a second image sensor configured to be prevented from being initialized based on executing the first launch sequence.

48. The apparatus of claim 47, further comprising a third image sensor configured to be initialized based on executing the first launch sequence.

49. The apparatus of claim 48, wherein:
the first image sensor and the second image sensor are RGB image sensors; and
the third image sensor is a non-RGB image sensor.

50. The apparatus of claim 47, wherein the second image sensor is further configured to be initialized an amount of time after preventing the second image sensor from being initialized based on executing the first launch sequence.

51. The apparatus of claim 50, wherein the second image sensor is configured to be initialized based on one or more of:
the first user input on the region of the display for greater than the amount of time after preventing the second image sensor from being initialized;
the first image sensor not capturing an image or video during the amount of time; or
the apparatus not obtaining a second user input during the amount of time.

52. The apparatus of claim 29, wherein executing the first launch sequence, based on the first user input of the first input type being on the region of the display for greater than the second threshold amount of time that is greater than the first threshold amount of time, causes the apparatus to perform one or more of:
the autofocus operation to determine the focus setting and initialize the camera using the determined focus setting;
the autoexposure operation to determine the exposure setting and initialize the camera using the determined exposure setting; or
the AWB operation to determine the AWB setting and configure an AWB filter using the determined AWB setting.

53. The apparatus of claim 29, wherein the second threshold amount of time is based on a time to perform one or more of:
the autofocus operation;
the autoexposure operation; or
the AWB operation.

54. The apparatus of claim 29, wherein executing the first launch sequence, based on the first user input of the first input type being on the region of the display for less than the second threshold amount of time, causes the apparatus to one or more of:
interrupt the autofocus operation and initialize the camera using the predetermined focus setting;
interrupt the autoexposure operation and initialize the camera using the predetermined exposure setting; or
interrupt the AWB operation and initialize the AWB filter using the predetermined AWB setting.

55. The apparatus of claim 29, wherein the display is configured to obtain a second user input on the region of the display, wherein:
the first user input and the second user input are the first input type;
the first user input is on a first subregion of the region of the display;
the second user input is on a second subregion of the region of the display; and
the processor, in executing the first launch sequence, causes:
a camera to capture a first image; and
one of:
the camera to capture a second image using settings different than for capturing the first image by the camera;
the camera to capture a video; or
the display to display a menu.

56. The apparatus of claim 29, wherein the camera application includes a video application.

57. A non-transitory, computer-readable medium storing instructions that, when executed by a processor of a device, cause the device to:
obtain a first user input on a region of a display;
determine whether the first user input is a first input type or a second input type, wherein:
the first input type is the first user input on the region of the display for greater than a first threshold amount of time; and
the second input type is the first user input on the region of the display for less than the first threshold amount of time; and
execute a first launch sequence of a camera application based on the first user input being the first input type, wherein executing the first launch sequence causes the device to one or more of:
initialize the camera using a predetermined focus setting based on a determination that the first user input of the first input type is on the region of the display for less than a second threshold amount of time that is greater than the first threshold amount of time or using a focus setting determined using an autofocus operation based on a determination that the first user input of the first input type is on the region of the display for greater than the second threshold amount of time;
initialize the camera using a predetermined exposure setting based on a determination that the first user input of the first input type is on the region of the display for less than the second threshold amount of time or using an exposure setting determined using an autoexposure operation based on a determination that the first user input of the first input type is on the region of the display for greater than the second threshold amount of time; or configure an automatic white balance (AWB) filter of an image signal processor using a predetermined AWB setting based on a determination that the first user input of the first input type is on the region of the display for less than the second threshold amount of time or using an AWB setting determined using an AWB operation based on a determination that the first user input of the first input type is on the region of the display for greater than the second threshold amount of time.

58. The computer-readable medium of claim 57, wherein execution of the instructions further causes the device to execute a second launch sequence of the camera application based on the first user input being the second input type.

59. The computer-readable medium of claim 58, wherein execution of the instructions further causes the device to:
display a camera application graphical user interface on the display in response to executing the second launch sequence; and
obtain a user input via the camera application graphical user interface.

60. The computer-readable medium of claim 57, wherein executing the first launch sequence is in response to a release of the first user input from the region of the display.

61. The computer-readable medium of claim 57, wherein execution of the instructions further causes the device to display a lock screen before obtaining the first user input, wherein the first user input is on the lock screen.

62. The computer-readable medium of claim 57, wherein obtaining the first user input includes obtaining the first user input on the display when the display is in a low power mode.

63. The computer-readable medium of claim 57, wherein execution of the instructions further causes the device to:
display a home screen including one or more icons before obtaining the first user input, wherein the one or more icons includes a camera application icon in the region of the display.

64. The computer-readable medium of claim 57, wherein executing the first launch sequence causes the display to display a menu, the menu including two or more selectable entries, wherein each selectable entry is associated with one or more operations consisting of one or more of:
executing the camera application;
capturing an image using default settings for a camera;
capturing an image using user custom settings for the camera;
capturing a video using default settings for the camera;
capturing a video using user custom settings for the camera;
performing a burst capture using default settings for the camera;
performing a burst capture using user custom settings for the camera;
capturing a live image using default settings for the camera; or
capturing a live image using user custom settings for the camera.

65. The computer-readable medium of claim 64, wherein execution of the instructions further causes the device to:
obtain a selection of one of the selectable entries; and
perform the one or more operations associated with the selection in response to obtaining the selection.

66. The computer-readable medium of claim 57, wherein executing the first launch sequence causes the device to:
instruct a camera controller coupled to the processor to capture an image or video using a camera; and
prevent the camera controller from performing one or more operations of the camera application.

67. The computer-readable medium of claim 66, wherein execution of the instructions further causes the device to:
capture the image or video in response to a release of the first user input of the first input type from the region of the display.

68. The computer-readable medium of claim 66, wherein execution of the instructions further causes the device to:
obtain a second user input; and
capture the image or video in response to obtaining the second user input and based on the first user input being the first input type.

69. The computer-readable medium of claim 68, wherein the second user input includes one or more of:
a bezel squeeze;
a movement of the device;
an increased pressure of the first user input on the region of the display;
a user press of a physical button;
an orientation of the device; or
another user input on the display.

70. The computer-readable medium of claim 66, wherein execution of the instructions further causes the device to determine an orientation of the device before obtaining the first user input, wherein executing the first launch sequence is also based on the orientation being a first orientation.

71. The computer-readable medium of claim 66, wherein execution of the instructions further causes the device to:
prevent the display from displaying a preview of the image or video to be captured based on the first user input being the first input type.

72. The computer-readable medium of claim 71, wherein preventing the display from displaying the preview includes preventing generating the preview by the processor.

73. The computer-readable medium of claim 72, wherein the first launch sequence excludes one or more operations of a second launch sequence associated with generating the preview.

74. The computer-readable medium of claim 66, wherein execution of the instructions further causes the device to:
display a windowed preview of the image or video to be captured based on executing the first launch sequence.

75. The computer-readable medium of claim 66, wherein execution of the instructions further causes the device to:
initialize a first image sensor based on executing the first launch sequence; and
prevent a second image sensor from being initialized based on executing the first launch sequence.

76. The computer-readable medium of claim 75, wherein execution of the instructions further causes the device to initialize a third image sensor based on executing the first launch sequence.

77. The computer-readable medium of claim 76, wherein:
the first image sensor and the second image sensor are RGB image sensors; and
the third image sensor is a non-RGB image sensor.

78. The computer-readable medium of claim 75, wherein execution of the instructions further causes the device to initialize the second image sensor an amount of time after preventing the second image sensor from being initialized based on executing the first launch sequence.

79. The computer-readable medium of claim 78, wherein initializing the second image sensor is based on one or more of:
the first user input on the region of the display for greater than the amount of time after preventing the second image sensor from being initialized;
the first image sensor not capturing an image or video during the amount of time; or
the device not obtaining a second user input during the amount of time.

80. The computer-readable medium of claim 57, wherein execution of the instructions further causes the device to:
based on the first user input of the first input type being on the region of the display for greater than the second threshold amount of time that is greater than the first threshold amount of time, perform one or more of:
the autofocus operation to determine the focus setting and initialize the camera using the determined focus setting;
the autoexposure operation to determine the exposure setting and initialize the camera using the determined exposure setting; or
the AWB operation to determine the AWB setting and configure an AWB filter using the determined AWB setting.

81. The computer-readable medium of claim 57, wherein the second threshold amount of time is based on a time to perform one or more of:
the autofocus operation;
the autoexposure operation; or
the AWB operation.

82. The computer-readable medium of claim 57, wherein, based on the first user input of the first input type being on the region of the display for less than the second threshold amount of time, execution of the instructions further causes the device to one or more of:
interrupt the autofocus operation and initialize the camera using the predetermined focus setting;
interrupt the autoexposure operation and initialize the camera using the predetermined exposure setting; or
interrupt the AWB operation and initializing the AWB filter using the predetermined AWB setting.

83. The computer-readable medium of claim 57, wherein execution of the instructions further causes the device to obtain a second user input on the region of the display, wherein:
the first user input and the second user input are the first input type;
the first user input is on a first subregion of the region of the display;
the second user input is on a second subregion of the region of the display;
execution of the first launch sequence based on the first user input causes the device to capture a first image by a camera; and
execution of the first launch sequence based on the second user input causes the device to perform one of:
capturing a second image by the camera using settings different than for capturing the first image by the camera;
capturing a video by the camera; or
displaying a menu.

84. The computer-readable medium of claim 57, wherein the camera application includes a video application.

85. An apparatus, comprising:
means for obtaining a first user input on a region of a display;
means for determining whether the first user input is a first input type or a second input type, wherein:
the first input type is the first user input on the region of the display for greater than a first threshold amount of time; and
the second input type is the first user input on the region of the display for less than the first threshold amount of time; and
means for executing a first launch sequence of a camera application based on the first user input being the first input type, wherein executing the first launch sequence causes the apparatus to one or more of:
initialize the camera using a predetermined focus setting based on a determination that the first user input of the first input type is on the region of the display for less than a second threshold amount of time that is greater than the first threshold amount of time or using a focus setting determined using an autofocus operation based on a determination that the first user input of the first input type is on the region of the display for greater than the second threshold amount of time;
initialize the camera using a predetermined exposure setting based on a determination that the first user input of the first input type is on the region of the display for less than the second threshold amount of time or using an exposure setting determined using an autoexposure operation based on a determination that the first user input of the first input type is on the region of the display for greater than the second threshold amount of time; or
configure an automatic white balance (AWB) filter of an image signal processor using a predetermined AWB setting based on a determination that the first user input of the first input type is on the region of the display for less than the second threshold amount of time or using an AWB setting determined using an AWB operation based on a determination that the first user input of the first input type is on the region of the display for greater than the second threshold amount of time.

86. The apparatus of claim 85, further comprising means for executing a second launch sequence of the camera application based on the first user input being the second input type.

87. The apparatus of claim 86, further comprising:
means for displaying a camera application graphical user interface on the display in response to executing the second launch sequence; and
means for obtaining a user input via the camera application graphical user interface.

88. The apparatus of claim 85, wherein executing the first launch sequence is in response to a release of the first user input from the region of the display.

89. The apparatus of claim 85, further comprising means for displaying a lock screen before obtaining the first user input, wherein the first user input is on the lock screen.

90. The apparatus of claim 85, wherein obtaining the first user input includes obtaining the first user input on the display when the display is in a low power mode.

91. The apparatus of claim 85, further comprising:
means for displaying a home screen including one or more icons before obtaining the first user input, wherein the one or more icons includes a camera application icon in the region of the display.

92. The apparatus of claim 85, wherein executing the first launch sequence causes the display to display a menu, the menu including two or more selectable entries, wherein each selectable entry is associated with one or more operations consisting of one or more of:
  executing the camera application;
  capturing an image using default settings for a camera;
  capturing an image using user custom settings for the camera;
  capturing a video using default settings for the camera;
  capturing a video using user custom settings for the camera;
  performing a burst capture using default settings for the camera;
  performing a burst capture using user custom settings for the camera;
  capturing a live image using default settings for the camera; and
  capturing a live image using user custom settings for the camera.

93. The apparatus of claim 92, further comprising:
  means for obtaining a selection of one of the selectable entries; and
  means for performing the one or more operations associated with the selection in response to obtaining the selection.

94. The apparatus of claim 85, wherein executing the first launch sequence causes the apparatus to:
  instruct capturing an image or video using a camera; and
  prevent one or more operations of the camera application from being performed.

95. The apparatus of claim 94, further comprising means for capturing the image or video in response to a release of the first user input of the first input type from the region of the display.

96. The apparatus of claim 94, further comprising:
  means for obtaining a second user input; and
  means for capturing the image or video in response to obtaining the second user input and based on the first user input being the first input type.

97. The apparatus of claim 96, wherein the second user input includes one or more of:
  a bezel squeeze;
  a movement of the apparatus;
  an increased pressure of the first user input on the region of the display;
  a user press of a physical button;
  an orientation of the apparatus; or
  another user input on the display.

98. The apparatus of claim 94, further comprising means for determining an orientation of the apparatus before obtaining the first user input, wherein executing the first launch sequence is also based on the orientation being a first orientation.

99. The apparatus of claim 94, further comprising means for preventing the display from displaying a preview of the image or video to be captured based on the first user input being the first input type.

100. The apparatus of claim 99, wherein preventing the display from displaying the preview includes preventing generating the preview.

101. The apparatus of claim 100, wherein the first launch sequence excludes one or more operations of a second launch sequence associated with generating the preview.

102. The apparatus of claim 94, further comprising means for displaying a windowed preview of the image or video to be captured based on executing the first launch sequence.

103. The apparatus of claim 94, further comprising:
  means for initializing a first image sensor based on executing the first launch sequence; and
  means for preventing a second image sensor from being initialized based on executing the first launch sequence.

104. The apparatus of claim 103, further comprising means for initializing a third image sensor based on executing the first launch sequence.

105. The apparatus of claim 104, wherein:
  the first image sensor and the second image sensor are RGB image sensors; and
  the third image sensor is a non-RGB image sensor.

106. The apparatus of claim 103, further comprising means for initializing the second image sensor an amount of time after preventing the second image sensor from being initialized based on executing the first launch sequence.

107. The apparatus of claim 106, wherein initializing the second image sensor is based on one or more of:
  the first user input on the region of the display for greater than the amount of time after preventing the second image sensor from being initialized;
  the first image sensor not capturing an image or video during the amount of time; or
  the apparatus not obtaining a second user input during the amount of time.

108. The apparatus of claim 85, further comprising, based on the first user input of the first input type being on the region of the display for greater than the second threshold amount of time that is greater than the first threshold amount of time, one or more of:
  means for performing the autofocus operation to determine the focus setting and initialize the camera using the determined focus setting;
  means for performing the autoexposure operation to determine the exposure setting and initialize the camera using the determined exposure setting; or
  means for performing the AWB operation to determine the AWB setting and configure an AWB filter using the determined AWB setting.

109. The apparatus of claim 85, wherein the second threshold amount of time is based on a time to perform one or more of:
  the autofocus operation;
  the autoexposure operation; or
  the AWB operation.

110. The apparatus of claim 85, further comprising, based on the first user input of the first input type being on the region of the display for less than the second threshold amount of time:
  means for interrupting the autofocus operation and initializing the camera using the predetermined focus setting;
  means for interrupting the autoexposure operation and initializing the camera using the predetermined exposure setting; or
  means for interrupting the AWB operation and initializing the AWB filter using the predetermined AWB setting.

111. The apparatus of claim 85, further comprising means for obtaining a second user input on the region of the display, wherein:
  the first user input and the second user input are the first input type;
  the first user input is on a first subregion of the region of the display;
  the second user input is on a second subregion of the region of the display;

execution of the first launch sequence based on the first user input causes capture of a first image by a camera; and execution of the first launch sequence based on the second user input causes one of:
  capturing a second image by the camera using settings different than for capturing the first image by the camera;
  capturing a video by the camera; or
  displaying a menu.

112. The apparatus of claim 85, wherein the camera application includes a video application.

* * * * *